United States Patent
Stafford et al.

(10) Patent No.: US 10,210,666 B2
(45) Date of Patent: *Feb. 19, 2019

(54) FILTERING AND PARENTAL CONTROL METHODS FOR RESTRICTING VISUAL ACTIVITY ON A HEAD MOUNTED DISPLAY

(71) Applicant: Sony Interactive Entertainment Inc., Tokyo (JP)

(72) Inventors: Jeffrey Roger Stafford, Redwood City, CA (US); Frederick Umminger, Oakland, CA (US); Steven Osman, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/718,877

(22) Filed: Sep. 28, 2017

(65) Prior Publication Data

US 2018/0018827 A1 Jan. 18, 2018

Related U.S. Application Data

(63) Continuation of application No. 14/844,466, filed on Sep. 3, 2015, now Pat. No. 9,779,554.

(Continued)

(51) Int. Cl.
*G06T 19/00* (2011.01)
*G06F 3/01* (2006.01)
(Continued)

(52) U.S. Cl.
CPC .......... *G06T 19/006* (2013.01); *A63F 13/211* (2014.09); *A63F 13/212* (2014.09);
(Continued)

(58) Field of Classification Search
CPC .. G06T 19/006; G09G 5/363; G09G 2354/00; A63F 13/212; A63F 13/24; G06F 3/011
See application file for complete search history.

(56) References Cited

U.S. PATENT DOCUMENTS 8,743,145 B1 * 6/2014 Price ..................... G06T 19/006
345/629
2003/0109312 A1 6/2003 Miura
(Continued)

FOREIGN PATENT DOCUMENTS

WO 2014143134 A1 9/2014

OTHER PUBLICATIONS

EP16715221.4, Ref. P113356EP, Communication pursuant to Article 94(3) EPC, dated Aug. 22, 2018.

*Primary Examiner* — Tapas Mazumder
(74) *Attorney, Agent, or Firm* — Penilla IP, APC

(57) ABSTRACT

A method for executing computer instructions for presenting an interactive environment in a head-mounted display (HMD) is described. The method includes identifying content associated with the interactive environment to be presented on the HMD for a user and determining whether an interactive object within the identified content satisfies a threshold for presentation to the user. The method includes augmenting the interactive object with augmentation data. The augmented data acts to change a characteristic of the interactive object. The operation of augmenting the interactive object is performed after determining that the interactive object does not satisfy the threshold for presentation to the user. The augmentation data modifies the interactive object to conform the interactive object to be within the threshold.

21 Claims, 19 Drawing Sheets

Related U.S. Application Data

(60) Provisional application No. 62/146,192, filed on Apr. 10, 2015.

(51) Int. Cl.

| | | |
|---|---|---|
| *G09G 5/36* | (2006.01) | |
| *A63F 13/212* | (2014.01) | |
| *A63F 13/24* | (2014.01) | |
| *A63F 13/69* | (2014.01) | |
| *A63F 13/75* | (2014.01) | |
| *A63F 13/26* | (2014.01) | |
| *A63F 13/211* | (2014.01) | |
| *H04N 21/234* | (2011.01) | |
| *H04N 21/431* | (2011.01) | |
| *H04N 21/45* | (2011.01) | |
| *H04N 21/454* | (2011.01) | |
| *H04N 21/4545* | (2011.01) | |
| *H04N 21/475* | (2011.01) | |
| *H04N 21/478* | (2011.01) | |

(52) U.S. Cl.
CPC ............ *A63F 13/24* (2014.09); *A63F 13/26* (2014.09); *A63F 13/69* (2014.09); *A63F 13/75* (2014.09); *G06F 3/011* (2013.01); *G09G 5/363* (2013.01); *A63F 2300/5586* (2013.01); *A63F 2300/609* (2013.01); *G09G 2354/00* (2013.01); *H04N 21/23412* (2013.01); *H04N 21/4318* (2013.01); *H04N 21/4532* (2013.01); *H04N 21/4542* (2013.01); *H04N 21/45452* (2013.01); *H04N 21/4755* (2013.01); *H04N 21/4781* (2013.01)

(56) References Cited

U.S. PATENT DOCUMENTS

| | | | |
|---|---|---|---|
| 2006/0130119 A1* | 6/2006 | Candelore | H04N 7/163 725/135 |
| 2008/0320558 A1 | 12/2008 | Imanishi et al. | |
| 2010/0001993 A1 | 1/2010 | Finn et al. | |
| 2010/0005423 A1 | 1/2010 | Finn et al. | |
| 2010/0138455 A1 | 6/2010 | Alewine et al. | |
| 2010/0177117 A1* | 7/2010 | Finn | G06F 3/14 345/619 |
| 2010/0235923 A1* | 9/2010 | Schepis | G06F 21/6218 726/26 |
| 2011/0035768 A1 | 2/2011 | Ling et al. | |
| 2011/0283311 A1 | 11/2011 | Luong | |
| 2013/0044106 A1 | 2/2013 | Shuster et al. | |
| 2013/0055162 A1* | 2/2013 | Arriola | G06F 17/30058 715/811 |
| 2014/0230033 A1* | 8/2014 | Duncan | G06F 21/32 726/7 |
| 2014/0362110 A1 | 12/2014 | Stafford | |
| 2015/0161609 A1* | 6/2015 | Christner | G06Q 20/4016 705/44 |
| 2015/0302648 A1* | 10/2015 | Zhang | G01B 11/2513 345/426 |

\* cited by examiner

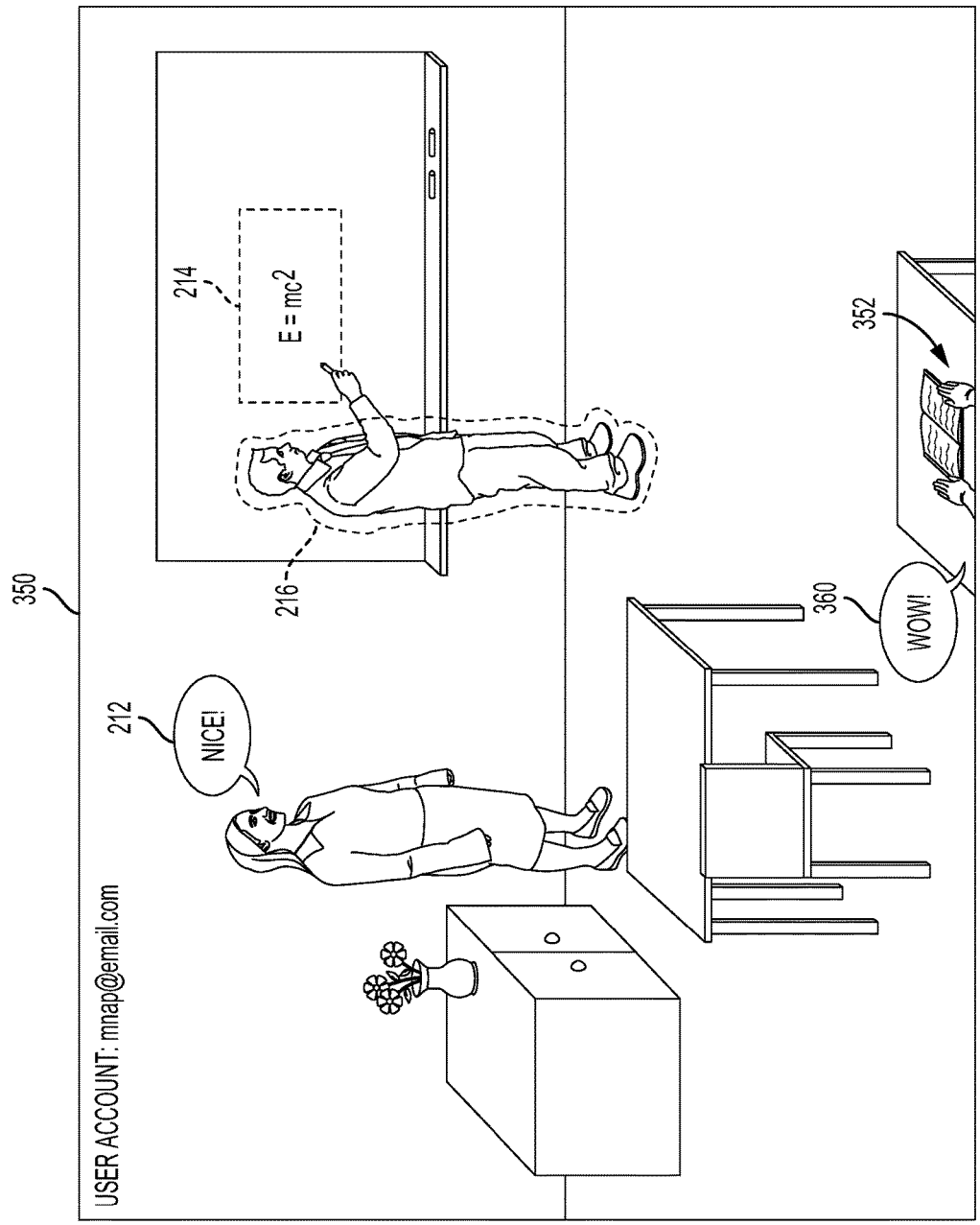

FILTERING AND PARENTAL CONTROL METHODS FOR RESTRICTING VISUAL ACTIVITY ON A HEAD MOUNTED DISPLAY

CLAIM OF PRIORITY

This application claims the benefit of and priority, under 35 U.S.C. § 120, to U.S. nonprovisional patent application Ser. No. 14/844,466, filed on Sep. 3, 2015, and titled "FILTERING AND PARENTAL CONTROL METHODS FOR RESTRICTING VISUAL ACTIVITY ON A HEAD MOUNTED DISPLAY", which claims the benefit of and priority, under 35 U.S.C. § 119(e), to U.S. Provisional Patent Application No. 62/146,192, filed on Apr. 10, 2015, and titled "FILTERING AND PARENTAL CONTROL METHODS FOR RESTRICTING VISUAL ACTIVITY ON A HEAD MOUNTED DISPLAY", both of which are hereby incorporated by reference in their entirety.

CROSS-REFERENCE TO RELATED APPLICATIONS

This application is related to U.S. patent application Ser. No. 14/684,308, titled "CONTROL OF PERSONAL SPACE CONTENT PRESENTED VIA HEAD MOUNTED DISPLAY", filed on Apr. 10, 2015, which is hereby incorporated by reference in its entirety.

FIELD

The present disclosure relates to filtering and parental control methods for restricting visual activity on a head mounted display.

BACKGROUND

A head-mounted display (HMD) device is worn on a head of a user when the user is viewing a graphical scene within the HMD. The HMD includes one optic display in front of an eye of the user or includes two optic displays in front of both eyes of the user to allow the user to view the graphical scene. The HMD is implemented as a helmet, or as eyeglasses, or as a visor. The graphical scene includes a virtual reality scene in which the user plays a game.

However, some games include images that are not appropriate for users of certain ages, e.g., children. For example, while a game may encourage a child to learn about a game or content, the game may include content that is improper for the child. As another example, the game or content may include language that is rated as mature or is not suitable for children.

SUMMARY

Embodiments of the present disclosure provide filtering and parental control methods for restricting presentation of content on a head mounted display.

Other aspects of the present disclosure will become apparent from the following detailed description, taken in conjunction with the accompanying drawings, illustrating by way of example the principles of embodiments described in the present disclosure.

In one embodiment, a method for executing computer instructions for presenting an interactive environment in a head-mounted display is described. The method includes identifying content associated with the interactive environment to be presented on the head-mounted display for a user and determining whether an interactive object within the identified content satisfies a threshold for presentation to the user. The operation of determining whether the interactive object satisfies the threshold is performed by analyzing one or more parameters regarding the user, a rating associated with the identified content, and a content level that is set by an administrator. The method includes augmenting the interactive object with augmentation data. The augmented data acts to change a characteristic of the interactive object. The operation of augmenting the interactive object is performed after determining that the interactive object does not satisfy the threshold for presentation to the user. The augmentation data modifies the interactive object to conform the interactive object to be within the threshold.

In an embodiment, a method for receiving approval from an administrator is described. The method includes identifying content associated with an interactive environment to be presented on an HMD for a user. The method further includes determining whether an interactive object within the identified content satisfies a threshold for presentation on the head-mounted display for the user. The operation of determining whether the interactive object satisfies the threshold is performed by analyzing information regarding the user and a rating of the interactive object. The method includes sending for approval to the administrator via a network, information associated with the interactive object in response to determining that the interactive object does not satisfy the threshold for presentation on the head-mounted display. The information associated with the interactive object identifies a display characteristic of the interactive object, the user, and the rating of the interactive object.

In one embodiment, a method for changing a shared interactive environment for a user is described. The method includes identifying content associated with the shared interactive environment. The shared interactive environment is to be presented on a display device of a first head-mounted display. The shared interactive environment is shared between the first user and a second user. The method includes determining whether an interactive object in the identified content satisfies a threshold for presentation on the display device of the first head-mounted display for the first user and satisfies a threshold for presentation on a display device of a second head-mounted display for the second user. The method further includes augmenting the interactive object after determining that the interactive object does not satisfy the threshold for presentation to the first user, providing the augmented interactive object to the first head-mounted display for the first user, and providing the interactive object to the second head-mounted display for the second user without augmenting the interactive object after determining that the interactive object satisfies the threshold for presentation to the second user.

Some advantages of the herein described systems and methods include allowing display of an interactive environment that has content suitable for users of certain ages. For example, an interactive environment that includes audio or image content that is unsuitable for children is filtered and/or augmented before the interactive environment is presented to a child. The interactive environment is augmented with data that passes the threshold for presentation to the users of certain ages.

BRIEF DESCRIPTION OF THE DRAWINGS

Various embodiments of the present disclosure are best understood by reference to the following description taken in conjunction with the accompanying drawings in which:

FIG. 3C is a diagram of a display device of the HMD on which a different classroom environment is displayed than a classroom environment shown in FIG. 3B to illustrate that data that does not satisfy a threshold is augmented, in accordance with one embodiment of the present disclosure.

DETAILED DESCRIPTION

Filtering and administrator control methods and systems for restricting content presented on a head mounted display are described. Some examples of an administrator include a parent of a user, a guardian of the user, an employer of the user, etc. As described below, in one embodiment, restricted content includes video content, visual content, image content, audio content, gesture content, or combinations of two or more thereof. It should be noted that various embodiments of the present disclosure are practiced without some or all of these specific details. In other instances, well known process operations have not been described in detail in order not to unnecessarily obscure various embodiments of the present disclosure.

In one embodiment, one of the filtering and parental control systems includes a computer, a controller, and a display. In various embodiments, the computer is a general purpose computer, a special purpose computer, or other such device which executes an interactive program, e.g., a computer software program, a computer software application, etc., for generating interactive data, e.g., virtual reality environment data, augmented reality environment data, etc., which is rendered to display interactive content on a display device. In some embodiments, instead of the computer, a game console, or portable game device, or a smart phone is used. Examples of game consoles include those manufactured by Sony Computer Entertainment Inc. or other manufacturers. Examples of the display device include a television, a monitor, a projector display, a head mounted display (HMD), or other such displays and display systems, which are capable of receiving and rendering video output from the computer. A user provides input to the interactive program by moving his/her body part, e.g., hands, legs, etc., and/or by operating a hand-held controller, etc. The system includes one or more cameras, which captures image data of the user and/or the hand-held controller and/or of a room in which the user is located. The image data is analyzed by the computer to determine a game state in which data regarding interactive objects, e.g., virtual reality objects, augmented reality objects, etc., is generated and then sent to the display for presentation. Examples of data regarding an interactive object include color, position, motion, texture, shade, shape, etc., of the interactive object.

Figure 1A:
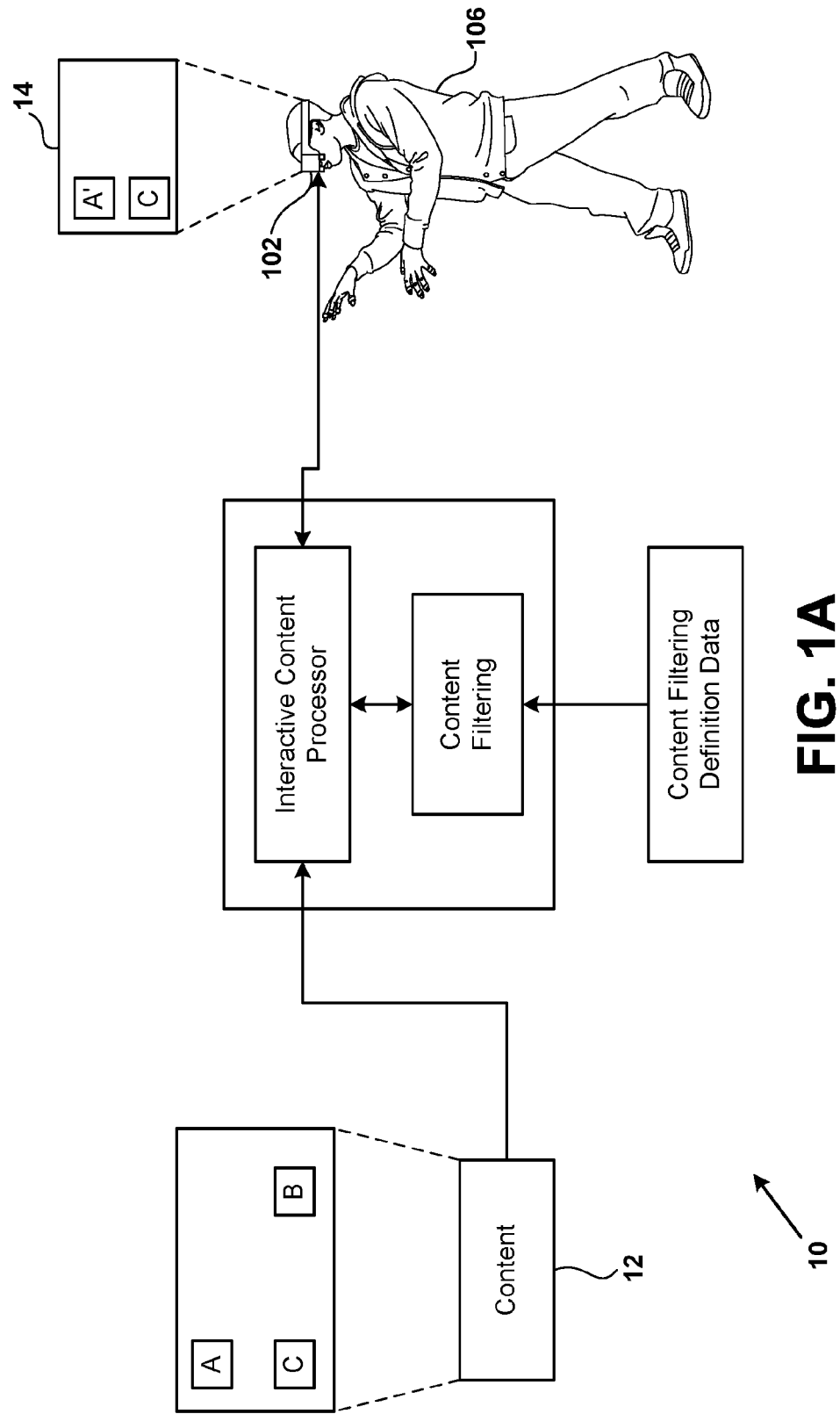
FIG. 1A is a diagram of a system for illustrating filtering according to definition data that is stored on one or more servers, in accordance with one embodiment of the present disclosure.

FIG. 1A is a diagram of an embodiment of a system 10 for illustrating content filtering according to data that is defined and stored in one or more servers. A user 106 is wearing a head-mounted display (HMD) 102 to interact with an environment. For example, the user 106 is playing a game displayed on the HMD 102. As another example, the user 106 is viewing a scene of a real-world location, e.g., Paris, London, Lake Tahoe, Cancun, Thailand, etc. As yet another example, the user 106 is in a video conference with another user and an image of the other user and a real-world environment, e.g., a room, etc., in which the other user is located is displayed on the HMD 106. Examples of the user 106 include a child, a teenager, an employee, a contract employee, etc.

While viewing the environment, the user 106 is about to view and/or listen to content 12 on the HMD 102. The content 12 is inappropriate for the user 106. For example, the content 12 includes audio that has words, e.g., labeled as "A" in FIG. 1A, etc., unfitting for providing as audio to the user 106. As another example, the content 12 has an obscene gesture, e.g., labeled as "B" in FIG. 1A, etc., that is inappropriate for displaying to the user 106. The content 12 includes data, e.g., labeled as "C" in FIG. 1A, etc., that is appropriate for the user 106.

An interactive content processor processes, e.g., filters, augments, filters and augments, etc. the content 12 according to content filtering definition data, e.g., profile information regarding the user 106, age of the user 106, biometric information regarding the user 106, usage history of prior use of interactive content by the user 106, ratings assigned to the content 12, ratings assigned to portions of the content 12, a rating selected by the administrator, a type of content selected by the administrator for access by the user 106, etc. For example, the interactive content processor determines that according to a rating assigned to gesture B, gesture B is inappropriate for an age of the user 106. The interactive content processor applies content filtering to the gesture B before the gesture B is displayed to the user 102. As another example, the interactive content processor determines that according to a type assigned to the word A, the word A is inappropriate for an age of the user 106. The interactive content processor determines to replace to the word A with another word A'. The word A, in this example, is any content, whether image or audio.

After processing the content 12, data for rendering content 14 is provided by the interactive content processor for display on the HMD 102 to the user 102. The content 14 excludes the gesture B and includes the word A' at a position at which the word A was to be displayed on the HMD 102.

Figure 1B:
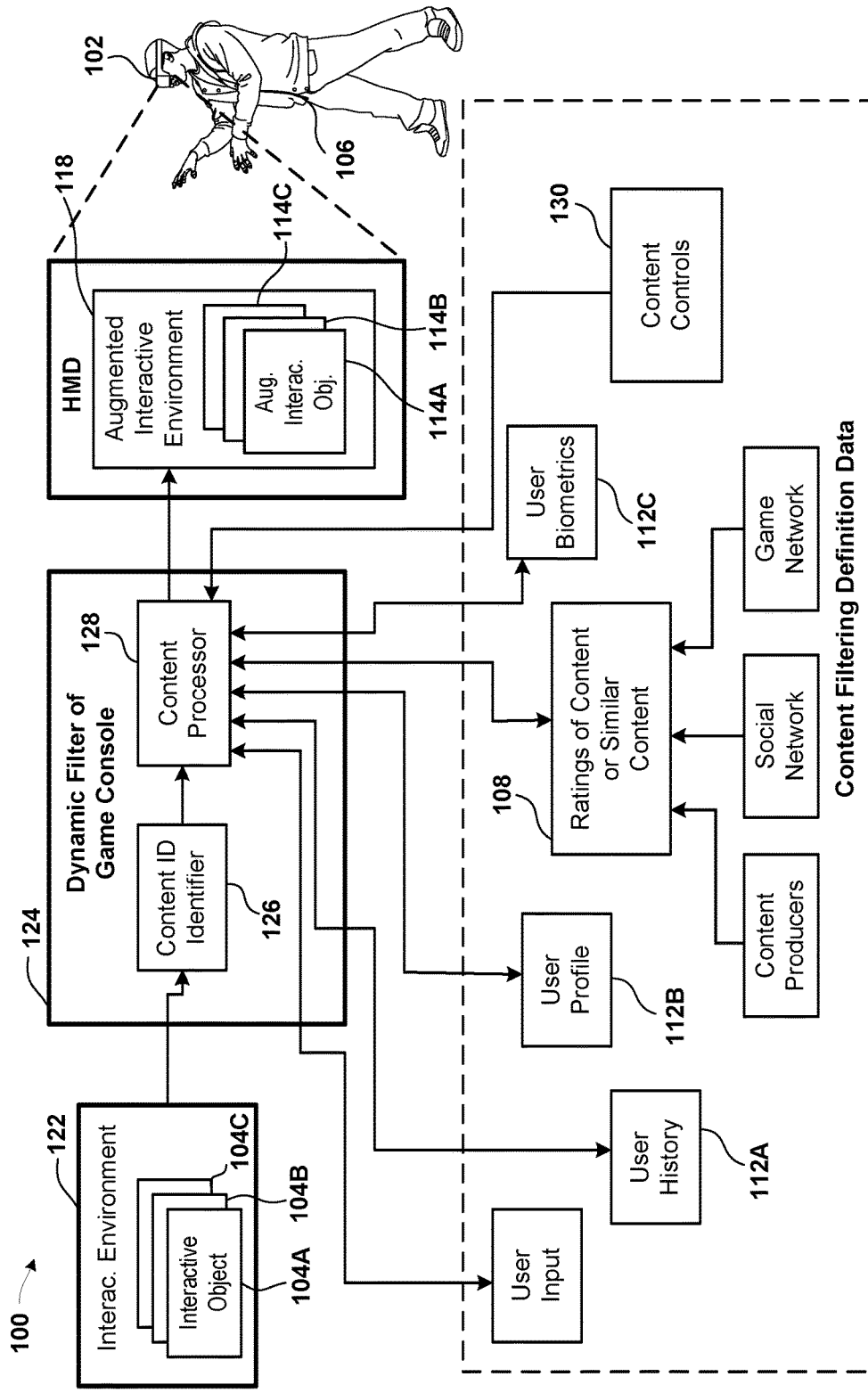
FIG. 1B is diagram of a system for illustrating dynamic control of skins of an interactive object, in accordance with one embodiment of the present disclosure.

FIG. 1B is diagram of an embodiment of a system 100 for illustrating dynamic control of skins of an interactive object. In an embodiment, "skins" is broadly understood to include augmentation data that is used to change a look and feel of a scene displayed on an HMD or scenes rendered in the HMD, or augment select interactive objects rendered in one or more scenes of an interactive presentation in the HMD. Examples of a look and feel are provided below. In one embodiment, a skin is a visual/image overlay content that is applied to one or more interactive objects to cover or change content displayed on an HMD. For example, if an interactive object in a scene is determined to be inappropriate according to the threshold for viewing by the user 102, the game processor augments the interactive object to hide, obscure, change, or modify the interactive object, e.g., to make the interactive object acceptable for presentation to the user 102, e.g., meeting the threshold, meeting a content control level selected by the administrator, meeting a content type level selected by the administrator, etc.

In one embodiment, a skin includes audio data, or graphics data, or a combination thereof.

As used herein, the user 106 is wearing the HMD 102 while the user 106 is about to view and/or listen to an interactive environment 122 on the HMD 102. The interactive environment 122 is to be displayed on a display screen of the HMD 102. The user 106 wears the HMD 102 on his/her head to cover his/her eyes with the display screen of the HMD 102. The HMD 102 is supported on a nose of the user 106 and/or a head of the user 106. In one embodiment, the HMD 102 allows the user 106 to see through the HMD 102 to view a real-world environment, e.g., a room in which the user 106 is standing, a wall of the room, a painting on the wall, a television within the room, or any other real-world object within the room, etc., in front of the user 106.

In an embodiment, the interactive environment 122 is to be displayed and/or provided as an audio output on the HMD 102 along with information regarding a user account assigned to the user 106 after authenticating login information that is received from the user 106. For example, the user 106 provides login information, e.g., username, password, etc., via an input device, e.g., a game controller, a hand-held controller, a keyboard, etc., and the login information is communicated, e.g., via a wireless protocol, via a wired protocol, etc., from the input device to a game processor of a game console. Examples of the wireless protocol include a Bluetooth protocol and a Wi-Fi protocol. Examples of the wired protocol include a serial data transfer protocol, a parallel data transfer protocol, and a universal serial bus (USB) protocol, etc. As another example, the user 106 provides the login information using hand motion, which is captured as image data by a camera, e.g., camera of the game console, camera in the real-world environment, camera of the HMD 102, etc. The login information is communicated from the camera via the wired or wireless protocol to the game processor of the game console.

The game processor sends the login information via a communication device, e.g., a network interface card, a network interface controller, etc., to an authentication server via a network, e.g., the Internet, an Intranet, a combination of the Internet and the Intranet, etc. The authentication server determines whether the login information is authentic by comparing the login information with pre-stored information. Upon determining that the login information is authentic, the authentication server communicates an indication of the authentication to the communication device of the game console. Upon receiving the indication of the authentication, the game processor provides access to a user account of the user 106 and to interactive environment data to the HMD 102 and communicates, via the wired or wireless protocol, information data, e.g., user name assigned to the user 106, email address assigned to the user 106, profile information regarding the user 106, etc., regarding the user account and the interactive environment data to the HMD 102. A processor of the HMD 102 renders, e.g., applies a rendering program, etc., to the interactive environment data and the information data to display and/or provide as audio output an interactive environment and information regarding the user account on a display screen of the HMD 102. Examples of information regarding a user account include a user name assigned by a server to the user 106, an email address assigned by a server to the user 106, or a photograph of the user 106, or a combination of two or more thereof.

In one embodiment, some information regarding a user account is provided by the user 106 to a server or the game processor of the game console during a registration process.

Examples of a processor, as used herein, include a microprocessor, an application specific integrated circuit (ASIC), a programmable logic device (PLD), a microcontroller, a central processing unit (CPU), etc.

Examples of an interactive environment, described herein, include an augmented reality (AR) scene, a virtual reality (VR) scene, a scene from a video game, a scene from a real-world location, a real-time video of a place to visit, a real-time video of a hotel, non-game content, etc. To illustrate, in an interactive environment, an avatar that represents the user 106 interacts with one or more other avatars that represents one or more other users in a shared network environment. As another illustration, in an interactive environment, an image of a body part, e.g., face, hands, legs, etc., of the user 106 is shown and an image of a body part of another user is shown. Both the users interact, e.g., talk, chat, etc., with each other in real-time via the interactive environment. As yet another illustration, data for rendering a real-time video of a real-world location is accessed from a server via the network by a content processor 128. The content processor 128 provides the data for rendering the real-time video to the HMD 102 for display of the real-time video on the HMD 102. As another illustration, image data that represents a body part of the user 106 is captured by a camera and the image data is provided from the camera to the content processor 128. The content processor 128 provides the image data to the HMD 102 for display in an interactive environment on the HMD 102.

In one embodiment, an interactive environment includes an audio output with a display of interactive objects within the interactive environment. For example, an interactive environment includes words spoken by an avatar in a game scene. As another example, an interactive environment includes sounds made by a vehicle.

In an embodiment, an interactive environment is a computer-simulated environment that immerses the user 106 into the interactive environment as if the user 106 is within the interactive environment. For example, the interactive environment provides the user 106 with sensory experiences, e.g., sight, touch, sound, etc., so that the user 106 feels as if he/she is a part of the interactive environment.

Examples of an interactive object, described herein, include a part of an interactive environment that is distinguishable from other parts of the interactive environment. An interactive object has a look and feel, e.g., a skin, texture, shade, color, smell, taste, feel, etc., and/or an audio output, e.g., sound, pitch, lyrics, words, etc. For example, an interactive object is an avatar, or part (e.g., hands, arms, etc.) of the avatar, or a ball, or a racquet, or a vehicle, or an animal, or a gun, or a wall, or text on a wall, or images on surfaces or things in an interactive environment, or any other interactive item that is shown in an interactive environment.

In one embodiment, a characteristic of an interactive object in an interactive environment is distinguishable from a characteristic of another interactive object in the interactive environment. For example, an interactive object is capable of talking and another interactive object is not capable of talking. As another example, an interactive object moves in a first direction in an interactive environment at a first time and another interactive object moves in a second direction in the interactive environment at the first time. As yet another example, an interactive object is of a first color and another interactive object is of a second color.

Examples of a look and feel of an interactive object include a color, or a shape of the interactive object when displayed on the HMD 102, or a font of the interactive object when displayed on the HMD 102, or a texture of the interactive object when displayed on the HMD 102, or a shade of the interactive object when displayed on the HMD 102, or a feel provided to the user 106 by the interactive object when the user 106 performs a gesture to touch or interact in another manner with the interactive object, or a taste provided to the user 106 by the interactive object when the interactive object is displayed on the HMD 102, or a smell provided by the interactive object to the user 106 when the interactive object is displayed on the HMD 102, or a sound output from the interactive object when the interactive object is displayed on the HMD 102, or a combination of two or more thereof, etc. For example, the HMD 102 includes various compartments and each compartment stores a liquid or gas that has a scent. When an interactive object is rendered on the HMD 102, a processor of the HMD 102 receives a signal for rendering an interactive environment from the game processor. For example, the processor of the HMD 102 receives a signal to augment an interactive object in a scene with augmentation data. Upon receiving the signal for rendering the interactive environment from the game processor, the processor of the HMD 102 controls a driver, e.g., transistor, group of transistors, etc., of the HMD 102. The driver controls a motor of the HMD 102 to open a compartment for a time period to provide a scent and/or taste to the user 106 and then to close the compartment after the time period. As another example, upon receiving the signal for rendering an interactive environment from the game processor, the processor of the HMD 102 sends a signal to a driver that is coupled to a haptic feedback device, e.g., a vibration motor, a tactile actuator, etc. The driver drives the haptic feedback device to move, e.g., vibrate, contract, expand, etc., the HMD 102 to provide haptic feedback to the user 106. The haptic feedback is an example of a touch sensation provided to the user 106 by the interactive object. Examples of audio that is output from the HMD 102 when the interactive object is displayed on the HMD 102 are provided below with reference to FIG. 5.

In an embodiment, a look and feel of an interactive object includes characteristics assigned to the interactive object by the game processor that do not include functions of the interactive object. Examples of functions of an interactive object include functions assigned to the interactive object by the interactive program that is stored within the game console for execution by the game processor. To illustrate, the functions include motions that the interactive object is capable of performing, words or sounds that the interactive object is capable of providing as audio output, positions on a display screen that the interactive object is capable of occupying, etc.

In one embodiment, the interactive environment 122 is to be displayed and/or provided as an audio output when a next game state is achieved. The next game state is achieved by the game processor of the game console when an input is received from the user 106 during a current game state or without the input being receipt from the user 106. For example, during a display of a current game state on the HMD 106, the game processor determines whether an input, e.g., a movement of the head of the user 106, a gesture performed by the user 106, a selection of a button of a hand-held controller, etc., is received via the wired protocol or the wireless protocol from the input device that is operated by the user 106 and/or from a camera. Upon determining that the input is received, the game processor identifies from a memory device of the game console the next game state. Examples of a memory device, as used herein, include a read-only memory (ROM), a random access memory (RAM), a volatile memory, a non-volatile memory, a Flash memory, a disc, etc. The next game state includes a look and feel and/or audio output of interactive objects within the interactive environment 122 and of a background of the interactive environment 122. The next game state is transferred from the game processor via the wired protocol or the wireless protocol to the HMD 102 for display of the interactive environment 122 on the HMD 102.

The game console includes a dynamic filter 124. A content identifier 126, e.g., a processor, a software module, etc., of the dynamic filter 124 identifies content, e.g., the interactive object 104A, another interactive object 104B, yet another interactive object 104C, etc., to be presented, e.g., via look and feel, via audio output, etc., within the interactive environment 122 to be presented on the HMD 102 for the user 106 for the next game state. For example, the content identifier 126 accesses identities (IDs), e.g., assigned names, assigned codes, assigned alphanumeric characters, etc., of the interactive objects 104A thru 104C to be presented in the interactive environment 122. To illustrate, the IDs are read from a memory device of the game console. The content identifier 126 provides the IDs to the content processor 128 of the dynamic filter 124. The content processor 128 is an example of the interactive content processor illustrated in FIG. 1A.

In one embodiment, the interactive object 104A is an avatar that represents a user sharing the interactive environment 122 with the user 106 and the interactive object 104C is an avatar that represents the user 106.

In an embodiment, the interactive object 104C is an avatar that represents a user sharing the interactive environment 122 with the user 106 and the interactive object 104A is an avatar that represents the user 106 or a part of the avatar that represents the user 106.

In an embodiment, the interactive object 104A is a part, e.g., hands, feet, chest, etc., of an avatar that represents a user sharing the interactive environment 122 with the user 106 and the interactive object 104C is an avatar that represents the user 106. For example, a camera that is located in a room in which a user is located captures image data of a body part, e.g., hands, feet, torso, etc. of the user. The image data is provided from the camera to the content processor 128 via the wired or wireless protocol. The content processor 128 processes the image data to determine a position of the body part in the room and to determine, from the position of the body part, a position of a part, e.g., hands, feet, torso, etc., of an avatar or an image that represents the user. To illustrate, when the body part moves in an x-direction in the room, the part of the avatar moves in the x-direction in an interactive environment on an HMD. As another illustration, when the body part moves a distance (x, y, z) in the room, the part of the avatar moves a scaled distance (x1, y1, z1) in an interactive environment. The distance (x1, y1, z1) is scaled with respect to the distance (x, y, z) to allow proportional movement between the body part and the part of the avatar.

Examples of a software module include a computer software program or a portion of a computer software program.

The content processor 128 requests for and obtains via the network one or more ratings of corresponding one or more interactive objects 104A thru 104C that are identified or one or more ratings of one or more interactive objects that are similar to the corresponding one or more interactive objects 104A thru 104C from a ratings server 108. In one embodiment, the content processor 128 requests for and obtains via the network one or more types of corresponding one or more interactive objects 104A thru 104C or one or more types of one or more interactive objects that are similar to the corresponding one or more interactive objects 104A thru 104C from the ratings server 108. To illustrate, the content processor 128 sends the IDs of the one or more interactive objects 104A thru 104C to obtain ratings of the one or more interactive objects 104A thru 104C and/or of one or more interactive objects similar to the one or more interactive objects 104A thru 104C. As another illustration, the content processor 128 sends the IDs of the one or more interactive objects 104A thru 104C to obtain types of the one or more interactive objects 104A thru 104C and/or of one or more interactive objects similar to the one or more interactive objects 104A thru 104C.

In one embodiment, a rating and/or type is assigned to an interactive object by content producers. Examples of the content producers include companies that create a game or another interactive environment. The content producers assign a rating to an interactive object via an input device of a client device, e.g., a smart phone, a desktop computer, a laptop, a tablet, etc., and the rating is transferred from a communication device of the client device via the network to a communication device of the ratings server 108 for storage and access.

In an embodiment, a rating and/or a type is assigned to an interactive object in a social network by one or more social network users. For example, a user logs into his/her social network account and posts a comment within the social network account for sending to a social network server that the interactive object 104A is rated as mature and is of a profane type. As another example, during a chat session between two users conducted via the social network, e.g., via social network accounts of the users and the social network server, etc., one of the two users indicate that the interactive object 104A should be rated as mature content. It should be noted that each user accesses a social network account stored on the social network server when user information is authenticated by the social network server.

In an embodiment, a rating and/or type is assigned to an interactive object by game players, e.g., the user 106, other users playing a game, etc. The game players log into their corresponding user game accounts and rate an interactive object. The rating is provided during an interactive chat session that occurs between the game players during a play of a game or before or after the play of the game. As another example, the rating is provided when the game processor of the game console requests a game player to assign the rating by sending to the HMD 102 a message requesting the game player to assign the rating and/or type.

In one embodiment, a first interactive object is similar to a second interactive object when the first and second interactive objects are assigned the same rating and/or type. To illustrate, when the first and second interactive objects are both profane words, both the first and second interactive objects are assigned a type profane by the game processor. As another illustration, when the first interactive object is an obscene gesture of a right hand of an avatar and the second interactive object is the same obscene gesture of a left hand of the avatar, both the first and second interactive objects are assigned a type obscene by the game processor. As yet another illustration, when the first interactive object is an obscene gesture of a right arm of an avatar and the second interactive object is the same obscene gesture of a left arm of the avatar, both the first and second interactive objects are assigned a type obscene by the game processor. Other examples of types assigned to an interactive object include a bloody interactive object, a violent interactive object, an interactive object with intense violence, a comic mischief interactive object, a lyrics interactive object, an interactive object with sexual content, an interactive object with cartoon violence, an interactive object with profane language, etc. Examples of rating of an interactive object include an early childhood rating, an everyone rating, an everyone 10+ rating, a teen rating, a mature rating, an adults only rating, and a rating pending rating, etc.

In an embodiment, a first interactive environment is similar to a second interactive environment when all interactive objects in the first interactive environment have the same rating and/or the same type as all interactive objects in the second interactive environment.

In an embodiment, the ratings server 108 determines a rating of an interactive object as an average of ratings of the interactive object received from the content producers, from the social network, and from the game network. For example, each rating of an interactive object is assigned a number and average of the numbers is calculated by the ratings server 108 to determine an average of the ratings received by the ratings server 108 from the content producers, the social network, and the game network.

In one embodiment, the ratings server 108 determines a rating of an interactive object as a median of ratings of the interactive object received from the content producers, from the social network, and from the game network. For example, each rating of an interactive object is assigned a number and a median of the numbers is calculated by the ratings server 108 to determine a median of the ratings received by the ratings server 108 from the content producers, the social network, and the game network.

In an embodiment, the ratings server 108 determines a type of an interactive object as an average of types of the interactive object received from the content producers, from the social network, and from the game network. For example, each type of an interactive object received by the ratings server 108 from the content producers, the social network, and the game network is assigned a number and an average of the numbers is calculated by the ratings server 108 to determine an average of the types for the interactive object.

In one embodiment, the ratings server 108 determines a type of an interactive object as a median of types of the interactive object received from the content producers, from the social network, and from the game network. For example, each type of an interactive object received by the ratings server 108 from the content producers, the social network, and the game network is assigned a number and a median of the numbers is calculated by the ratings server 108 to determine a median of the types for the interactive object.

The content processor 128 of the dynamic filter 124 determines whether an interactive object that is identified by the content identifier 126 satisfies a threshold for presentation to the user 106. For example, the content processor 128 requests from a user history server 112A via the network, a history of the user 106, and receives the user history via the network from the user history server 112A. Examples of history of the user 106 include a rating of an interactive environment that is previously displayed and/or provided as audio output to the user 106, a type of the interactive environment that is previously displayed to the user 106 and/or provided as audio output to the user 106, etc. In an embodiment, the interactive environment that is previously displayed and/or provided as audio output to the user 106 is similar to or the same as the interactive environment 122. Examples of ratings of an interactive environment include an early childhood rating, an everyone rating, an everyone 10+ rating, a teen rating, a mature rating, an adults only rating, and a rating pending rating, etc. Examples of types of an interactive environment include a bloody interactive environment, a violent interactive environment, an interactive environment with intense violence, a comic mischief interactive environment, a lyrics interactive environment, an interactive environment with sexual content, an interactive environment with cartoon violence, an interactive environment with profane language, etc.

Continuing with the example of determining whether an interactive object that is identified by the content identifier 126 satisfies the threshold, the content processor 128 determines whether one or more of the interactive objects 104A thru 104C to be displayed are within an interactive environment that has a rating that is similar to or the same as a rating of an interactive environment that is previously displayed and/or provided as audio output to the user 106 and/or that is of a type similar to or the same as a type of the interactive environment that is previously displayed and/or provided as audio output to the user 106. For example, the content processor 128 determines whether the user 106 previously viewed and/or heard an interactive environment that is rated early childhood and is now about to view and/or hear an interactive environment that is rated mature. As another example, the content processor 128 determines whether the user 106 previously viewed and/or heard a lyrics interactive environment and is about to view and/or hear an interactive environment with cartoon violence. Upon determining that an interactive object is to be displayed has a rating that is similar to or the same as a rating of an interactive object that is previously displayed and/or provided as audio output to the user 106 and that is of a type similar to or the same as a type of the interactive object that is previously displayed and/or provided as audio output to the user 106, the content processor 128 determines that the interactive object satisfies the threshold. On the other hand, upon determining that an interactive object is to be displayed has a rating that is not similar to a rating of an interactive object that is previously displayed and/or provided as audio output to the user 106 and/or that is of a type not similar to a type of the interactive object that is previously displayed and/or provided as audio output to the user 106, the content processor 128 determines that the interactive object does not satisfy the threshold.

In one embodiment, instead of both the type and rating of an interactive object, the content processor 128 uses the type or the rating to determine whether the interactive object satisfies the threshold. For example, upon determining that an interactive object is to be displayed has a rating that is similar to or the same as a rating of an interactive object that is previously displayed and/or provided as audio output to the user 106, the content processor 128 determines that the interactive object satisfies the threshold. On the other hand, upon determining that an interactive object is to be displayed has a rating that is not similar to a rating of an interactive object that is previously displayed and/or provided as audio output to the user 106, the content processor 128 determines that the interactive object does not satisfy the threshold.

In an embodiment, an interactive object has a first rating is similar to a second rating of another interactive object when both the ratings are within a range. For example, on a scale that progressively rates in an increasing order of numbers interactive objects from an early childhood rating to an everyone 10+ rating to a teen rating to a mature rating and further to an adults only rating, two of the ratings that are adjacent to each other are within the range. To illustrate, when the early childhood rating is assigned a number of 1, the everyone 10+ is assigned a number of 2 and the teen rating is assigned a number of 3, the numbers 1 and 2 are adjacent to each other and the numbers 1 and 3 are not adjacent to each other. The everyone 10+ rating is within the range of the early childhood rating and the teen rating is not within the range of the early childhood rating.

In an embodiment, an interactive object that is of a first type is similar to a game of a second type when both the types are within a range of each other. For example, on a scale that lists types of interactive objects from mild violence to intermediate violence to intense violence, two of the types that are adjacent to each other are within the range. To illustrate, when the mild violence type is assigned a number of 1, the intermediate violence type is assigned a number of 2 and the intense violence is assigned a number of 3, the numbers 1 and 2 are adjacent to each other and the numbers 1 and 3 are not adjacent to each other. The intermediate violence type is within the range of intense violence type and the intense violence type is not within the range of mild violence type.

As another example of determining whether an interactive object that is identified by the content identifier 126 satisfies the threshold for presentation to the user 106, the content processor 128 requests from a user profile server 112B via the network a profile of the user 106. The profile 106 of the user 106 includes information regarding the user 106, e.g., an age of the user 106, a year of graduation from high school of the user 106, a married or unmarried status of the user 106, a photograph of the user 106, etc. It should be noted that in one embodiment, the user 106 provides some of the information regarding himself/herself during the registration process to the user profile server 112B via the network.

In an embodiment, the content processor 128 analyzes information regarding the user 106 to determine an age of the user 106. For example, the content processor 128 determines that hair color of the user 106 is not grey and that a face of the user 106 fits within pre-defined boundaries to determine that the user 106 is less than 18 years old. As another example, the content processor 128 determines that a height of the user 106 is less than a height limit to determine that the user 106 is less than 10 years old.

Continuing with the example of determining whether an interactive object that is identified by the content identifier 126 satisfies the threshold for presentation to the user 106, the content processor 128 determines whether one or more of the interactive objects 104A thru 104C have a rating and/or a type associated with an age that is within a pre-determined range from an age of the user 106 accessed from the profile information. To illustrate, the content processor 128 determines that the interactive object 104A has a rating of everyone 10+ and the user 106 is less than 10 years old to determine that the rating is associated with an age that is outside the pre-determined range from the age of the user 106. As another illustration, the content processor 128 determines that the interactive object 104A has a rating of early childhood and the user 106 is less than 10 years old to determine that the rating is associated with an age that is within the pre-determined range from the age of the user 106.

Upon determining that an interactive object has a rating and a type that is associated with an age within the pre-determined range from an age of the user 106, the content processor 128 determines that the profile of the user 106 satisfies the threshold. On the other hand, upon determining that an interactive object has a rating or a type that is associated with an age not within the pre-determined range from an age of the user 106, the content processor 128 determines that the profile of the user 106 does not satisfy the threshold.

In an embodiment, instead of both the type and rating of an interactive object, the rating or the type is used to determine whether the profile of the user 106 satisfies the threshold. For example, upon determining that an interactive object has a rating that is associated with an age within the pre-determined range from an age of the user 106, the content processor 128 determines that the profile of the user 106 satisfies the threshold. On the other hand, upon determining that an interactive object has a rating that is associated with an age not within the pre-determined range from an age of the user 106, the content processor 128 determines that the profile of the user 106 does not satisfy the threshold.

As another example of determining whether an interactive object that is identified by the content identifier 126 satisfies the threshold for presentation to the user 106, the content processor 128 generates a request for obtaining biometric information regarding the user 106 and provides the request to the user 106 via the wired or wireless protocol to a user biometric device 112C. Examples of the user biometric device 112C include a digital camera, a fingerprint scanner, etc. To illustrate, the user biometric device 112C captures the biometric information, e.g., perpendicular distance between eyes of the user 106, fingerprints of the user 106, height of the user 106, hair color of the user 106, etc., that identifies the user 106 and distinguishes the user 106 from other users.

The content processor 128 determines an age of the user 106 from the biometric information. To illustrate, upon determining that a perpendicular distance between eyes of the user 106 is less than a pre-defined distance, the content processor 128 determines that the user 106 is less than 10 years old. As another illustration, upon determining that a height of the user 106 is less than a pre-defined height, the content processor 128 determines that the user 106 is less than 10 years old.

Continuing with the example of determining whether an interactive object that is identified by the content identifier 126 satisfies the threshold for presentation to the user 106, the content processor 128 determines whether one or more of the interactive objects 104A thru 104C have a rating and/or a type associated with an age that is within a pre-determined range from an age of the user 106 accessed from the biometric information. Upon determining that an interactive object has a rating and a type that is associated with an age within the pre-determined range from an age of the user 106 determined from the biometric information, the content processor 128 determines that the profile of the user 106 satisfies the threshold. On the other hand, upon determining that an interactive object has a rating or a type that is associated with an age not within the pre-determined range from an age of the user 106 determined from the biometric information, the content processor 128 determines that the profile of the user 106 does not satisfy the threshold.

In an embodiment, instead of both the type and rating of an interactive object, the rating or the type is used to determine whether the biometric information of the user 106 satisfies the threshold. For example, upon determining that an interactive object has a rating that is associated with an age within the pre-determined range from an age of the user 106, the content processor 128 determines that the biometric information of the user 106 satisfies the threshold. On the other hand, upon determining that an interactive object has a rating that is associated with an age not within the pre-determined range from an age of the user 106, the content processor 128 determines that the biometric information of the user 106 does not satisfy the threshold.

It should be noted that in one embodiment, the history of the user 106, the profile information regarding the user 106, and the biometric information regarding the user 106 are examples of one or more parameters regarding the user.

As another example of determining whether an interactive object that is identified by the content identifier 126 satisfies the threshold, the content processor 128 receives from a content control server 130 via the network a content control level that is set by an administrator. The content control level is further described below. The administrator logs into an administrator account when login information provided by the administrator is authenticated by the authentication server. Examples of the administrator include a parent of a child, a guardian of the child, an employer, an owner, etc. The content processor 128 determines whether a rating assigned to an interactive object exceeds the content control level. Upon determining that the rating exceeds the content control level, the content processor 128 determines that the interactive object does not satisfy the threshold. On the other hand, upon determining that the rating does not exceed the content control level, the content processor 128 determines that the interactive object satisfies the threshold.

As yet another example of determining whether an interactive object that is identified by the content identifier 126 satisfies the threshold, the content processor 128 receives from the content control server 130 via the network a content type level that is set by the administrator. The content type level is further described below. The content processor 128 determines whether a type assigned to an interactive object exceeds the content type level. Upon determining that the type exceeds the content type level, the content processor 128 determines that the interactive object does not satisfy the threshold. On the other hand, upon determining that the type does not exceed the content type level, the content processor 128 determines that the interactive object satisfies the threshold.

It should be noted that content control level or content type level is sometimes referred to herein as a content level.

In one embodiment, the content processor 128 uses a combination of two or more of the history of the user 106, the profile of the user 106, the biometric information regarding the user 106, the content control level provided by the administrator, and the content type level provided by the administrator to determine whether an interactive object satisfies the threshold. For example, upon determining that an interactive object satisfies the threshold based on the history of the user 106 and the profile of the user 106, the content processor 128 determines that the interactive object satisfies the threshold. On the other hand, upon determining that the interactive object does not satisfy the threshold based on the history of the user 106 and/or based on the profile of the user 106, the content processor 128 determines that the interactive object does not satisfy the threshold. As another example, upon determining that an interactive object satisfies the threshold based on the history of the user 106, the profile of the user 106, and the biometric information regarding the user 106, the content processor 128 determine that the interactive object satisfies the threshold. On the other hand, upon determining that the interactive object does not satisfy the threshold based one or more of the history of the user 106, the profile of the user 106, and the biometric information regarding the user 106, the content processor 128 determines that the interactive object does not satisfy the threshold. As yet another example, upon determining that an interactive object satisfies the threshold based on the history of the user 106, the profile of the user 106, the biometric information regarding the user 106, and the content level, the content processor 128 determine that the interactive object satisfies the threshold. On the other hand, upon determining that the interactive object does not satisfy the threshold based one or more of the history of the user 106, the profile of the user 106, the biometric information regarding the user 106, and the content level, the content processor 128 determines that the interactive object does not satisfy the threshold. As another example, upon determining that an interactive object satisfies the threshold based on the history of the user 106, the profile of the user 106, the biometric information regarding the user 106, content type level, and the content control level, the content processor 128 determines that the interactive object satisfies the threshold. On the other hand, upon determining that the interactive object does not satisfy the threshold based one or more of the history of the user 106, the profile of the user 106, the biometric information regarding the user 106, the content control level, and the content type level, the content processor 128 determines that the interactive object does not satisfy the threshold.

Upon determining that an interactive object does not satisfy the threshold, the content processor 128 augments the interactive object with augmentation data. For example, an obscene gesture in the interactive environment 122 is replaced with a decent gesture. As another example, profane text in the interactive environment 122 is replaced with clean text. As yet another example, a look and feel of the interactive object 104A and the interactive object 104B are changed to replace an obscene gesture and a profane word. As another example, an audio output that includes a profane word is replaced with an audio output of a clean word. As yet another example, a skin of the interactive object 104A is replaced with another decent skin and a skin of the interactive object 104B is replaced with another decent skin. Examples of augmentation data include text, audio data, graphics data, look and feel, skin, etc. To illustrate, augmentation data converts a background or an interactive object of an interactive environment into black and white, e.g., like in an old movie, etc., from colored or into colored from black and white. As another illustration, augmentation data transforms an image of the user 106 displayed in the HMD 102 into a cartoon. It should be noted that a skin, a look and feel, and a gesture of an interactive object are examples of a visual characteristic of the interactive object. When augmentation data is applied to an interactive object, the interactive object is conformed to be within the threshold.

On the other hand, upon determining that an interactive object satisfies the threshold, the content processor 128 does not augment the interactive object with augmentation data. For example, upon determining that the interactive object 104C satisfies the threshold, the content processor 128 does not augment the interactive object 104C with augmentation data and the interactive object 104C is displayed within the augmented interactive environment 118.

The content processor 128 generates augmented interactive environment data upon augmenting the interactive object 104A with augmented data and augmenting the interactive object 104B via augmentation data. The content processor 128 applies the wired protocol or the wireless protocol to provide the augmented interactive environment data via communication devices of the game console and of the HMD 102 to the processor of the HMD 102. The processor of the HMD 102 renders the augmented interactive environment data to display an augmented interactive environment 118 on one or more display screens of the HMD 102. For example, the HMD 102 includes one optic display for each eye of the user 106. As another example, the HMD 102 includes one optical display shared between eyes of the user 106. As yet another example, images are rendered on the HMD 102 by projecting images onto one or both eyes of the user 106. It should be noted that the example illustrated above regarding rendering images on one or both eyes of the user 106 is for illustrative purposes and in one embodiment, there are various other ways of displaying images that represent an interactive environment, e.g., an augmented interactive environment, etc., on one or both eyes of the user 106. The augmented interactive environment 118 includes an augmented interactive object 114A, which is displayed after applying augmentation data to the interactive object 104A. The augmented interactive environment 118 also includes an augmented interactive object 114B, which is displayed after applying augmentation data to the interactive object 104B. The augmented interactive environment 118 includes the augmented interactive object 104C.

In an embodiment, a communication between the content processor 128 and a server, e.g., the user history server 112, the user profile server 112C, the content control server 130, the ratings server 108, etc., is facilitated by a communication device of the game console and a communication device of the server. For example, a network interface controller of the game console applies a transmission control protocol on top of Internet protocol to packetize data to be transferred to a network interface controller of the server. As another example, a network interface controller of a sever, e.g., the user history server 112, the user profile server 112C, the content control server 130, the ratings server 108, etc., applies a transmission control protocol on top of Internet protocol to packetize data to be transferred to a network interface controller of the game console.

It should be noted that in an embodiment in which the digital camera is located within the game console, there is no need to transfer the biometric information via the wireless protocol from the user biometric device 112C to the game console.

It should be noted that in one embodiment, the wireless or wireless protocol is executed by a communication device of the game console and by a communication device of the HMD 102 for facilitating a transfer of data between the game console and the HMD 102.

It should be noted that in an embodiment, when a game is being described as being played by the user 106, the game is being played when the user 106 accesses the game via a user account that is assigned to the user 106. Moreover, it should be noted that when an interactive environment is being described as being displayed and/or provided as audio output to the user 106, the interactive environment is being displayed and/or provided as audio output to the user 106 during access of a user account assigned to the user 106.

In an embodiment, the HMD 102 includes a number of display screens.

In one embodiment, an interactive environment includes one or more interactive objects.

In one embodiment, an interactive object is augmented with augmentation data while preserving functionality of the interactive object. For example, an interactive object is augmented with augmentation data when there is substantially no change in an action performed by the interactive object. To illustrate, an avatar is able to perform actions of walking, talking, jumping, seeing, listening, fighting, grabbing other interactive objects, moving other interactive objects, exhibiting emotions, etc., before and after augmenting the avatar. As another illustration, an avatar is able to drive an interactive car or shoot an interactive gun before and after augmenting the avatar. As another illustration, after augmenting an interactive object, there is a change in a look and feel of the interactive object but no change in movement of the interactive object. As yet another illustration, there is a change in a movement of the interactive object when an augmentation to a look and feel of the interactive object or another interactive object affects the movement. When words on a board in a classroom environment are changed from inappropriate words to clean words, hand motion of an avatar who is writing the words is changed to display that the avatar is writing clean words instead of indecent words.

In an embodiment, an interactive environment is displayed to the user 106 when the interactive environment is displayed for greater than a pre-determined amount of time and via a user account of the user 106.

In an embodiment, an interactive environment is provided as an audio output to the user 106 when a sound during display of the interactive environment is provided as output for greater than a pre-determined amount of time and via a user account of the user 106.

In an embodiment, a user input is received via an input device, e.g., a hand-held controller, a joystick, a motion controller, etc., that is held by the user 106 or via a body part motion of the user 106 and the user input is used to augment interactive data. For example, the user 106 indicates a selection of a look and feel or a skin of an interactive object via an input device or the body part motion. The body part motion is captured as image data by a camera and the input received via the input device is sent via the wired or wireless protocol to the game processor of the game console. An interactive object is augmented according to the selection received from the user 106. For example, an interactive object is augmented with a look and feel that is selected by the user 106. To further illustrate, the interactive object that is augmented is an avatar of a user, other than the user 106, and the other user controls the avatar. The augmented interactive object is sent from the game processor to the processor of the HMD 102 for display on the HMD 102.

In one embodiment, the content processor 128 determines whether the user input satisfies the threshold and upon determines that the user input does not satisfy the threshold, the content processor 128 further augments the augmented interactive object with augmentation data so that the further augmented interactive object satisfies the threshold. The further augmentation interactive object is then sent to the HMD 102 for display.

In one embodiment, the content processor 128 and the game processor are used interchangeably herein and refer to the same processor.

In one embodiment, an interactive object is one that interacts with the user 102 or one that does not interact with the user 102. For example, an interactive object is a box that is placed at a location in an interactive environment and does not move within the interactive environment and is not responsive to interaction from the user 102. To illustrate, when the user 102 performs a hand motion to move the box from one location to another in the interactive environment, the game processor does not move the box. As another example, an interactive object is one that moves of responds to an input received from the user 102. To illustrate, when the user 102 performs a gesture, e.g., a hand gesture, a body gesture, a foot gesture, etc., an avatar that represents the user 102 moves within an interactive environment or talks or displays the gesture in the interactive environment.

Figure 1C:
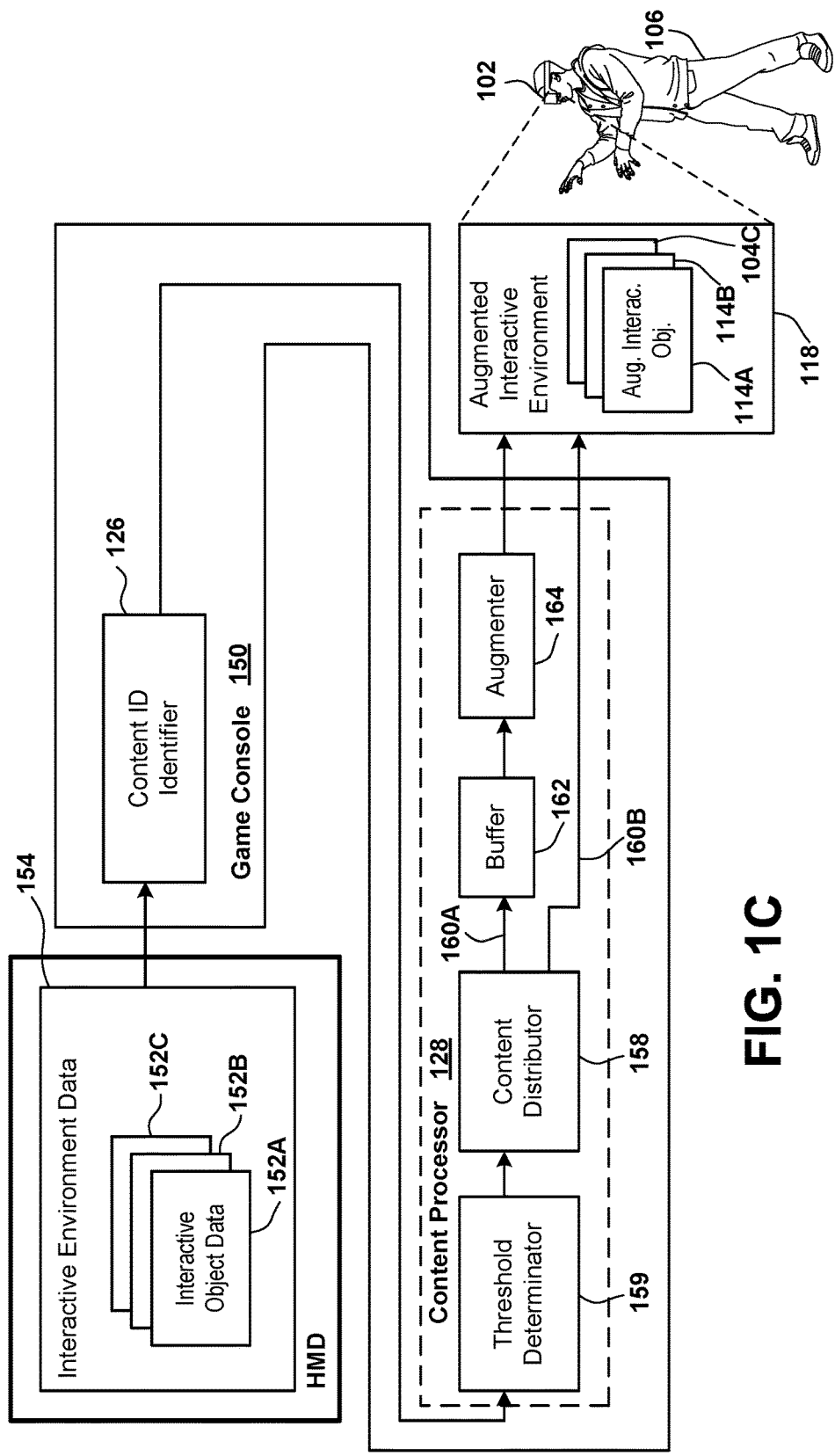
FIG. 1C is a diagram of a game console to illustrate buffering of interactive object data for augmenting the interactive object data with augmentation data, in accordance with one embodiment of the present disclosure.

FIG. 1C is a diagram of an embodiment of a game console 150 to illustrate buffering of interactive object data for augmenting the interactive object data with augmentation data. The game console 150 includes the content identifier 126, which is implemented using a processor or a software module that is executed by a processor. The content identifier 126 parses interactive environment data 154 to distinguish interactive object data 152A from interactive object data 152B and to distinguish the interactive object data 152A and 152B from interactive object data 152C. To illustrate, the content identifier 126 distinguishes a name pre-assigned to the interactive object data 152A from a name pre-assigned to the interactive object data 152B. As another example, the content identifier 126 parses the interactive environment data 154 to distinguish background data within the interactive environment data 154 from each of the interactive object data 152A, 152B, and 152C.

A threshold determinator 156 of the content processor 128 determines whether an interactive object satisfies the threshold in a manner described herein. A content distributor 159 of the content processor 128 receives a determination whether an interactive object satisfies a threshold for the interactive object data 152A thru 152C and distributes the interactive object data 152A thru 152C between links 160A and 160B according to whether the interactive object data 152A thru 152C satisfies the threshold. Examples of each link 160A and 160B includes a serial communication medium, parallel communication mediums, USB communication mediums, etc. In one embodiment, a medium, referred to herein, is a conductor, e.g., a wire, etc. The content distributes 159 provides the interactive object data 152A and 152B that does not satisfy the threshold to the link 160A, and provides the interactive object data 152C that satisfies the threshold to the link 160B.

A buffer 162 of the content processor 128 receives the interactive object data 152A and 152B via the link 160A and temporarily stores the interactive object data 152A and 152B. An example of a buffer 162 includes one or more sequences of one or more gates, e.g., inverting gates, non-inverting gates, etc. An augmenter 164 of the content processor 128 augments the interactive object data 152A and 152B with augmentation data to generate augmented interactive object data. The buffering of interactive object data 152A and 152B generates a time delay in providing the interactive object data 152A and 152B to the augmenter 164 to allow the augmenter 164 to augment the interactive object data 152A and 152B. The augmented interactive data is communicated using the wired or the wireless protocol from a communication device of the game console 150 to a communication device of the HMD 102. Moreover, the interactive object data 152C is received by a communication device of the game console 150 from the content distributor 159 and is communicated using the wired or the wireless protocol to a communication device of the HMD 102. The processor of the HMD 102 renders the augmented interactive object data received from the augmenter 164 to display the augmented interactive objects 114A and 114B on the HMD 102 and renders the interactive object data 152C transferred via the link 160B to display the interactive object 104C on the HMD 102.

In one embodiment, the content processor 128 does not include the buffer 162 and the interactive object data 152A and 152B is provided from the content distributor 159 to the augmenter 164.

It should be noted that in one embodiment, each of the threshold determination 156 and the augmenter 162 are implemented as separate processor or as separate software modules. Moreover, in an embodiment, the content splitter is implemented as a processor.

The interactive object data 152A is to be rendered by the processor of the HMD 102 to display the interactive object 104A (FIG. 1B), the interactive object data 152B is to be rendered by the processor of the HMD 102 to display the interactive object 104B (FIG. 1B), and the interactive object data 152C is to be rendered by the processor of the HMD 102 to display the interactive object 104C (FIG. 1B). Similarly, the interactive environment data 154 is to be rendered by the processor of the HMD 102 to display the interactive environment 122 (FIG. 1B).

In one embodiment, the augmenter 164 associates a position of the look and feel of an interactive object, e.g., the interactive object 104A, 104B, etc., with a position of the interactive object to facilitate a movement of the look and feel with a movement of the interactive object in the augmented interactive environment 118. For example, the augmenter 164 establishes a link between a position of the interactive object 104A to be augmented and a position of augmentation data for augmenting the interactive object 104A. As the interactive object 104A moves in the augmented interactive environment 118, a look and feel that augments the interactive object 104A also moves with the interactive object 104A to display the augmented interactive object 114A. As another example, the augmenter 164 establishes a correspondence between a position of the interactive object 104B and a position of augmentation data for augmenting the interactive object 104B. The augmentation data effectively provides a cover for the interactive object 104B. With movement of the interactive object 104B from a first position to a second position in the augmented interactive environment 118, augmentation applied to the interactive object 104B moves with the interactive object 104B from the first position to the second position.

Figure 1D:
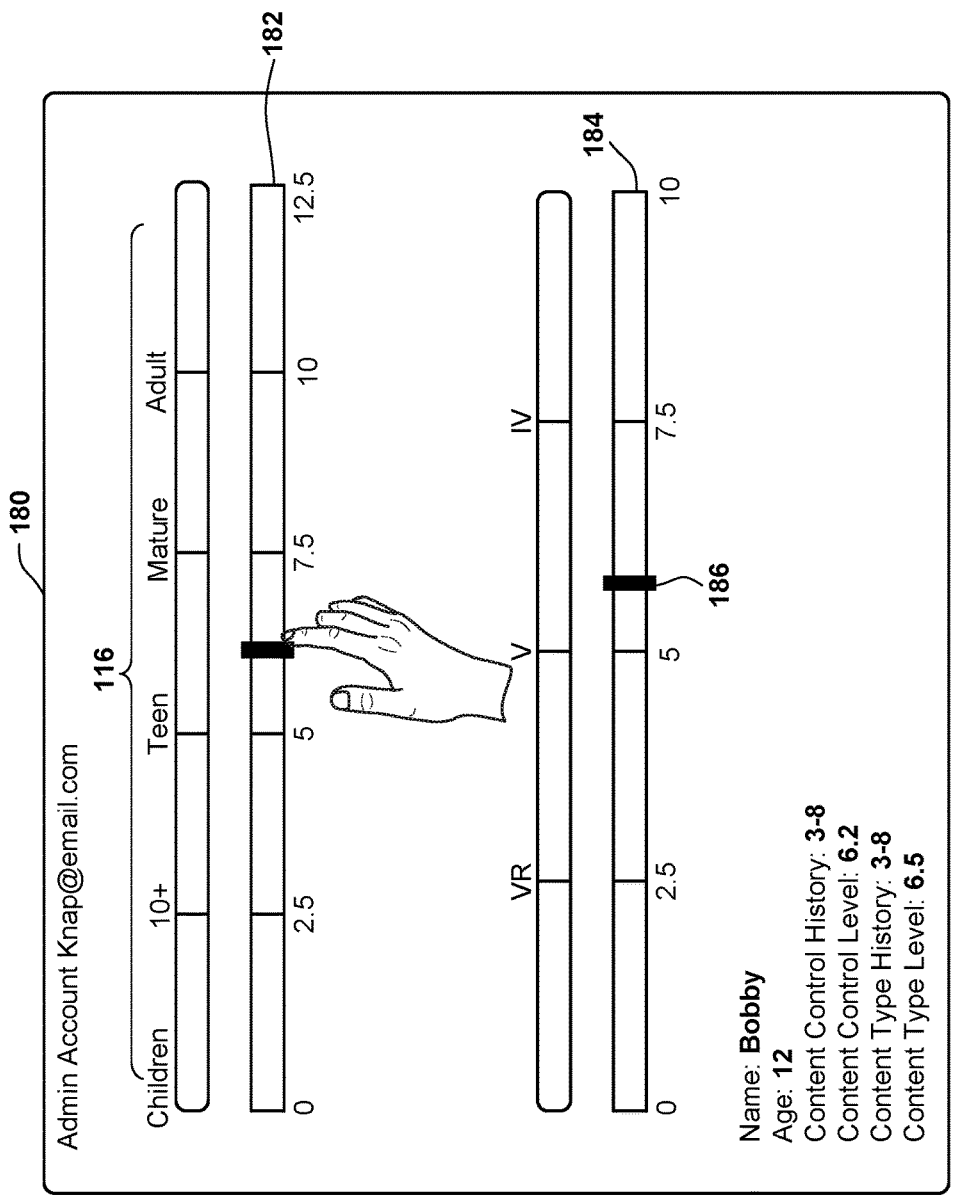
FIG. 1D is a diagram of a display screen of a computing device that is operated by an administrator, in accordance with one embodiment of the present disclosure.

FIG. 1D is a diagram of a display screen 180 of a computing device, e.g., a client device, etc., that is operated by the administrator. The administrator logs into his/her administrator account that is stored on a server connected to the network. The display screen 180 displays control levels 182 for an interactive object. The control levels 182 include scores that range from 0 to 12.5. The score of 0 indicates an early childhood rating, the score of 2.5 indicates an everyone 10+ rating, the score of 5 indicates a teen rating, the score of 7.5 indicates a mature rating, and the score of 10 indicates an adult rating. The ratings of early childhood, everyone 10+, teen, mature, and adult are examples of industry standard ratings. The industry standard ratings are illustrated as a range 116 on the display screen 180 and the range 116 ranges from the industry standard rating of early childhood to the industry standard rating of adult. The administrator uses his/her hand to touch a touch screen of the client device to achieve a control level 110 for an interactive object as desired by the administrator. The control level 110 is selected by the administrator from among the control levels 182. In one embodiment, the administrator uses a control input device, e.g., a button, a keypad, a mouse, a keyboard, a stylus, etc., to change the control level 110. The control level 110 that defines a rating for an interactive object and that is selected by the administrator is sent by a communication device of the client device via the network to the content control server 130 (FIG. 1B) for storage and further for access by the content processor 128 (FIG. 1B).

The display screen 180 further displays a content type level 184 for an interactive object. The content type level 184 ranges from violent references (VR) further to violence (V) and further to intense violence (IV). A score of 2.5 within the content type level 184 indicates that an interactive object depicts violent references, a score of 5 within the content type level 184 indicates that an interactive object depicts violence, and a score of 7.5 within the content type level 184 indicates that an interactive object depicts intense violence.

A content type level 186 is selected by the administrator in a manner similar to selecting the content control level 110. The content type level 186 that defines a type for an interactive object and that is selected by the administrator is sent by a communication device of the client device via the network to the content control server 130 for storage and further for access by the content processor 128.

The display screen 180 further shows a user name of a user, e.g., the user 106 (FIG. 1B), an age of the user 106, a content control history of the user 106, a content control level of 6.2, a content type history of the user 106, and a content type level of 6.5. The user name and the age are requested and obtained by the content control server 130 from the user profile server 112B (FIG. 1B) or from the content processor 128 or from the biometric device 112C (FIG. 1B) via the network. The content control history indicates a range of content control levels previously selected by the administrator for interactive objects allowed to be viewed by the user 106. Moreover, the content control level of 6.2 is the content control level 110 that is selected by the administrator for an interactive object, e.g., the interactive object 104A (FIG. 1B), etc., to be viewed by the user 106. The content type history indicates a range of content type levels previously selected by the administrator for interactive objects allowed to be viewed by the user 106. Also, the content type level of 6.5 is the content type level 186 that is selected by the administrator for an interactive object, e.g., the interactive object 104A (FIG. 1B), etc., to be viewed by the user 106. Each time the administrator selects a content control level and a content type level, the content control level and the content type level are sent from a communication device of the computing device to a communication device of the content control server 130 for storage in the content control server 130.

It should be noted that although the content type level 184 is related to different degrees of violence, in one embodiment, instead of violence, a content type level includes degrees of profanity or obscenity or sexuality.

In one embodiment, the administrator account of the administrator and user account of the user 106 are linked. For example, the administrator logs into the administrator account. When the administrator logs into the administrator account, a communication regarding the log in is sent from the client device 202 to an account server via the network. The account server manages information regarding accounts, e.g., user account, administrator account, etc. When the communication regarding the log in is received, the account server provides access to the user account of the user 106 to the administrator. When the user account is accessed, the control levels 182 for the user account and content type levels 184 for the user account are displayed by the processor system 210 on the display device 212 of the client device 202. Moreover, the administrator then selects the control level 110 and/or the content type level 186. As another example of linking between the administrator account and a user account, account information, e.g., one or more parameters regarding the user 106, user profile information regarding the user 106, email address of user account of the user 106, user biometric information regarding the user 106, administrator profile information, administrator biometric information, etc., regarding the user 106 and the administrator are stored within the same file within the account server for access by the administrator on the client device 202.

Figure 2A:
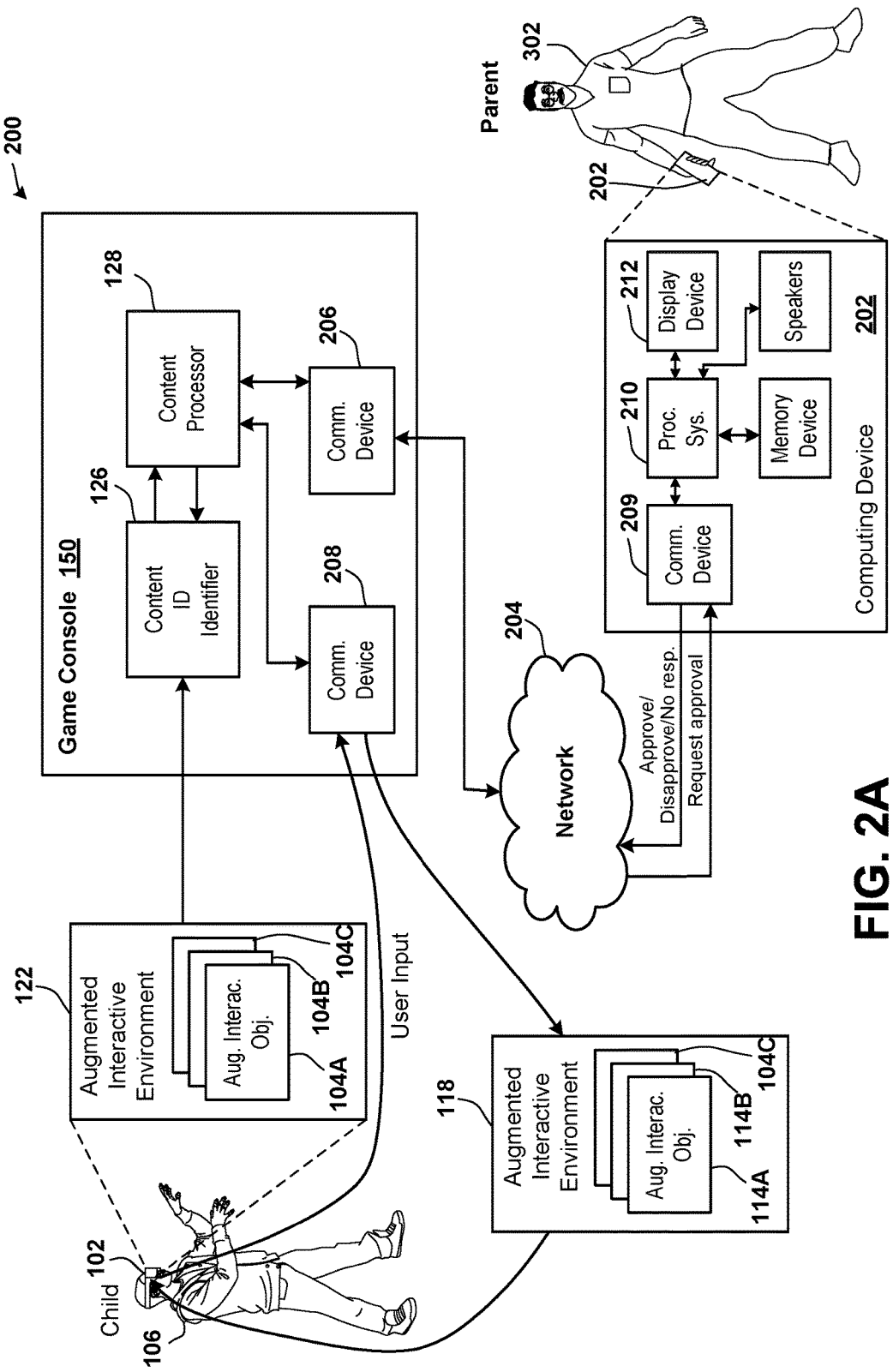
FIG. 2A is a diagram of a system for illustrating obtaining an approval or a disapproval from a user for an interactive object that is about to be displayed or provided as an audio output to another user, in accordance with one embodiment of the present disclosure.

FIG. 2A is a diagram of an embodiment of a system 200 for illustrating obtaining an approval or a disapproval from a user 302, e.g., a parent or a guardian of the user 106, the administrator, etc., for an interactive object that is about to be displayed or provided as an audio output on the HMD 102 to the user 106. The system 200 includes the game console 150, a computing device 202, a network 204, and the HMD 102.

In one embodiment, a computing device and a client device are used interchangeably herein.

The game console 150 includes a communication device 206 and another communication device 208. The communication device 206 applies a network protocol, e.g., an IP protocol, a TCP/IP protocol, a proprietary communication protocol, etc., to communicate with the computing device 202 and servers, described herein, via a network 204, e.g., the Internet, an Intranet, a wide area network, a local area network, etc. The communication device 208 applies the wireless or wired protocol to communicate with the HMD 102.

Upon receiving a determination that an interactive object does not satisfy the threshold from the content processor 128, the communication device 206 sends for approval to the computing device 202 via the network 204. The communication device 206 sends information associated with the interactive object when the interactive object does not satisfy the threshold. Examples of the information associated with the interactive object include a display characteristic of the interactive object, profile information regarding the user, biometric information regarding the user, history of the user, a rating assigned to the interactive object, a type of the interactive object, a rating assigned to an interactive object similar to the interactive object, a type assigned to the similar interactive object, etc. Examples of a display characteristic of the interactive object include a look and feel of the interactive object, audio output of the interactive object, skin of the interactive object, gesture of the interactive object, image of the interactive object, a video of the interactive object, an interactive environment in which the interactive object is to be displayed, etc.

The information associated with the interactive object is sent to a communication device 209 of the computing device 202. The communication device 209 applies the network protocol, e.g., depacketization protocol, etc., to retrieve the information associated with the interactive object and provides the information associated with the interactive object to a processor system 210 of the computing device 202. A processor system includes one or more processors. The processor system 210 renders the information associated with the interactive object on a display device 212 of the computing device 202. For example, the processor system 210 displays an image of the interactive object 104A and the interactive object 104B to be displayed on the HMD 102. As another example, the processor system 210 provides an audio output that is to be provided on the HMD 102 with a display of the interactive object 104A. As yet another example, the processor system 210 displays text of the interactive object 104A. As another example, the processor system 210 displays a rating assigned to the interactive object 104A and/or to another interactive object similar to the interactive object 104A. As yet another example, when the user 302 logs into his/her user account, the processor system 202 displays the information associated with the interactive object. Examples of a display device include an LED display device, an LCD display device, a cathode ray tube (CRT) display device, a plasma display device, etc.

The user 302 indicates his/her approval by selecting an approval checkbox that is rendered by the processor system 210 with the information associated with the interactive object on the display device 212 or by entering text indicating approval of the user 302. The approval of the user 302 is sent by the communication device 209 via the network 204 to the communication device 206. Upon receiving the approval, the content processor 128 determines not to augment the interactive object for which the approval is received and provides interactive environment data to the HMD 102 for rendering the interactive environment 122.

On the other hand, the user 302 indicates his/her disapproval by selecting a disapproval checkbox that is rendered by the processor system 212 with the information associated with the interactive object on the display device 212 or by entering text indicating disapproval of the user 302. The disapproval of the user 302 is sent by the communication device 209 via the network 204 to the communication device 206. Upon receiving the disapproval, the content processor 128 determines to augment the interactive object for which the disapproval is received and provides interactive environment data to the HMD 102 for rendering the interactive environment 118.

In one embodiment, during a time in which the information associated with the interactive object is sent to the computing device 202 for approval and until the approval is received from the user 302, the content processor 128 augments data regarding the interactive object with augmentation data in response to determining that the interactive object does not satisfy the threshold for presentation on the HMD 102. For example, until the approval is received from the computing device 202 by the game console 150, interactive environment data used to render the interactive environment 122 is augmented by the content processor 128 with augmentation data to generate augmented interactive environment data. The augmented interactive environment data is sent by the content processor 128 via the communication device 208 and a communication device of the HMD 102. The processor of the HMD 102 renders the augmented interactive environment data to display the augmented interactive environment 118 on the HMD 102.

In the embodiment, when the approval is received by the content processor 128, the content processor 128 determines to replace the data for rendering the augmented interactive environment 118 with data for rendering the interactive environment 122. For example, upon receiving the approval from the user 302, the content processor 128 sends interactive environment data for rendering the interactive environment 122 upon receiving the approval from the user 302. To illustrate, the content processor 128 sends via the communication device 208 interactive object data to a communication device of the HMD 102. The communication device of the HMD 102 applies the wired or wireless protocol to retrieve the interactive object from signals received from the communication device 208, and provides the interactive object data to the processor of the HMD 102. The processor of the HMD 102 renders the interactive object data to display the interactive object 104A at a position at which the augmented interactive object 114A was being displayed. On the other hand, when the disapproval is received from the user 302, the content processor 128 determines to continue the presentation of the augmented interactive environment 118 without a need to send interactive environment data for rendering the interactive environment 122.

In one embodiment, a position of an interactive object is determined with respect to a reference co-ordinate, e.g., origin (0, 0, 0), etc., at a corner of a display screen, e.g., a display screen of the HMD 102, etc., on which the interactive object is displayed.

In an embodiment, in addition to determining that the interactive environment 118 is to be augmented while the content processor 128 is waiting for a response to a request for approval sent to the computing device 202, the content processor 128 generates an instruction for indicating on the HMD 102 to the user 106 that the augmented interactive environment 118 will be presented on the HMD 102 until the approval is received from the user 302. The content processor 128 sends the instruction to the communication device 208, which communicates, using the wired protocol or the wireless protocol, the instruction to a communication device of the HMD 102. The communication device provides the instruction to the processor of the HMD 102. The processor of the HMD 102 renders the instruction to display the instruction on one or more display screens of the HMD 102. In addition, the content processor 128 augments data regarding the interactive environment 122 to generate data regarding the augmented interactive environment 118 and sends the data regarding the augmented interactive environment 118 to the communication device 208. The communication device applies the wired or the wireless protocol to send the data regarding the augmented interactive environment 118 to a communication device of the HMD 102. The HMD 102 renders the data regarding the augmented interactive environment to display the augmented interactive environment 118 on the HMD 102 until a response to the request for approval is received from the computing device 202 by the content processor 128.

In one embodiment, upon sending a request for approval to the user 302 via the network 204, the content processor 128 sends a pause instruction and an instruction to indicate the user 106 to wait until the approval is received. The pause instruction and the instruction to indicate to wait are sent via the communication device 208 and a communication device of the HMD 102 to the processor of the HMD 102. Upon receiving the pause instruction, the processor of the HMD 102 pauses a display of a preceding interactive environment from proceeding to a display of the interactive environment 122. The preceding interactive environment is displayed on the HMD 102 preceding to a display of the interactive environment 122. The preceding interactive environment excludes an interactive object that does not satisfy the threshold and the interactive environment 122 includes the interactive objects 104A and 104B that do not satisfy the threshold. Moreover, upon receiving the instruction to indicate to wait, the processor of the HMD 102 displays the instruction on one or more display screens of the HMD 102 to inform the user 106 that the interactive environment being presented via the HMD 102 is paused until an approval from the user 302 is received.

In the embodiment, when the approval is received by the content processor 128, the content processor 128 determines that the interactive environment 122 is to be presented via the HMD 102. For example, the interactive environment 122 is a next state, e.g., a next game state, etc., that follows the interactive environment that is paused. The content processor 128 identifies the interactive environment 122 as the next state and provides data for rendering the interactive environment 122 via the communication device 208 and a communication device of the HMD 102 to the processor of the HMD 102. Upon receiving the data for rendering the interactive environment 122, the processor of the HMD 102 renders the interactive environment 122.

Further, in the embodiment, upon receiving disapproval from the user 302, the content processor 128 augments data for rendering the interactive environment 122 with augmentation data to generate data for rendering the augmented interactive environment 118. For example, the content processor 128 changes a look and feel of data for rendering the interactive environment 122 and/or changes an audio output of the data for rendering the interactive environment 122. As another example, the content processor 128 removes one or more elements of data for rendering the interactive object 104A to generate data for rendering the interactive object 114A. To illustrate, the content processor 128 removes obscene gesture data and replaces the obscene gesture data with decent data, e.g., data that indicates decency, data that is clean, etc. As another illustration, the content processor 128 removes profane words or text and replaces the profane words or text with clean language. The content processor 128 sends the data for rendering the augmented interactive environment 118 via the communication device 208 and a communication device of the HMD 102 to the processor of the HMD 102, and the processor of the HMD 102 renders the augmented interactive environment 118 on one or more display screens of the HMD 102.

In one embodiment, a display to a user includes a display of an interactive environment when a user account of the user is accessed by the user. The user account is accessed when login information provided by the user is authenticated.

In an embodiment, the processor system 210 includes an audio/video (A/V) separator that separates audio data from image data received from the communication device 209. The image data is sent by the A/V separator to a processor of the processor system 210 for rendering the image data to display an image, e.g., an image of an interactive object, etc., on the display device 212. The audio data is sent to a synchronizer of the processor system 210 for synchronizing a display of the image data with output of the audio data via one or more speakers on the computing device 202. The synchronizer schedules for playing sound associated with display of an interactive object at the same time the interactive object is displayed. The synchronizer sends the audio data to a digital-to-analog converter that converts the audio data from a digital format into an analog format. The analog audio data is amplified by an amplifier (A) of the processor system 210. The amplified analog audio data is converted into sound by the one or more speakers of the computing device 202.

Figure 2B:
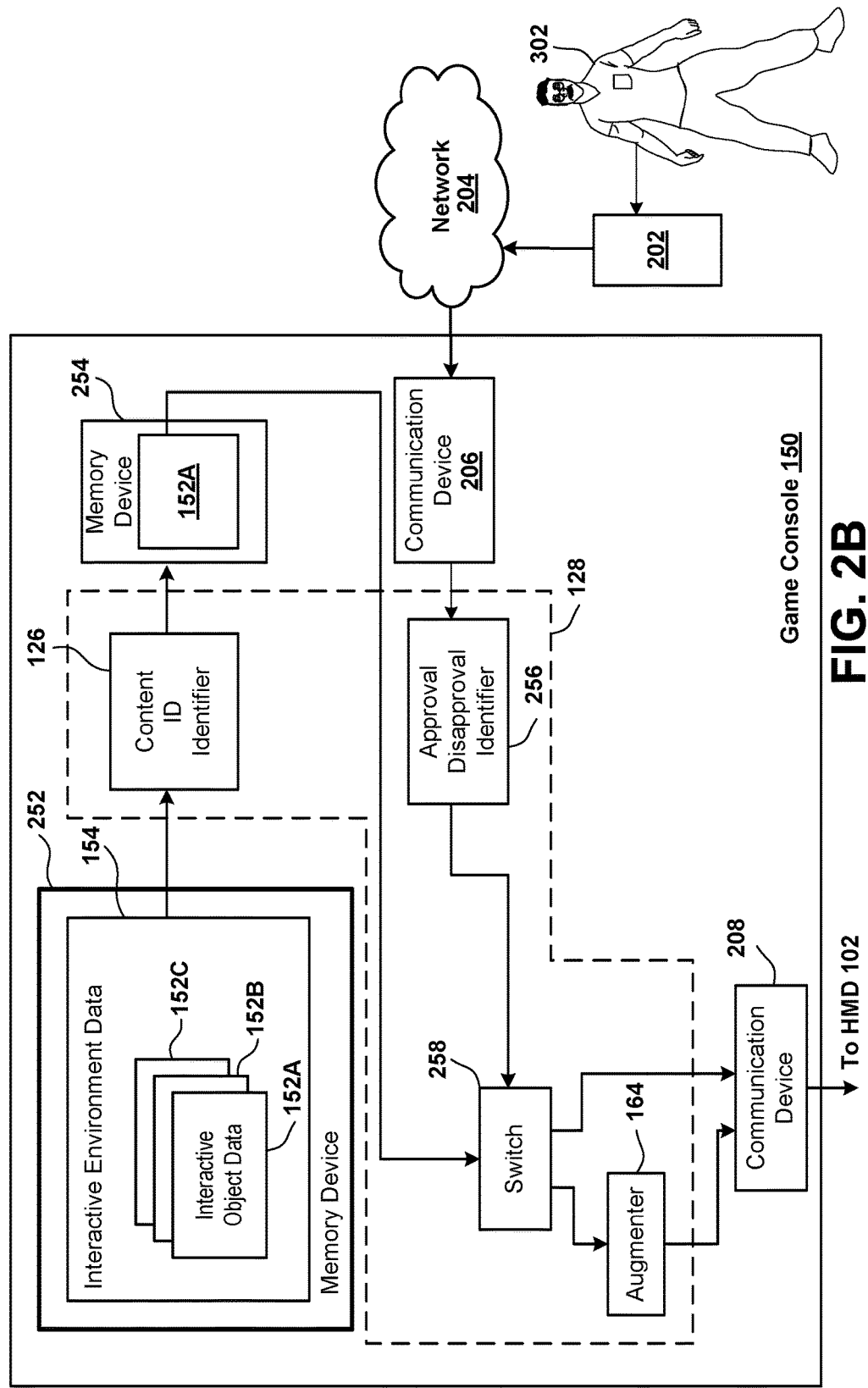
FIG. 2B is a diagram of a game console to illustrate augmentation of interactive environment data according to whether an approval or disapproval is received from a user, in accordance with one embodiment of the present disclosure.

FIG. 2B is a diagram of an embodiment of the game console 150 to illustrate augmentation of interactive environment data according to whether an approval or disapproval is received from the user 302. The content identifier 126 parses the interactive environment data 154 that is stored in a memory device 252 to identify the interactive object data 152A compared to other interactive objects 152B and 152C of the interactive environment data 154. The interactive object data 152 that is identified is stored by the content identifier 126 in a memory device 254.

An approval/disapproval identifier 256 distinguishes an approval that is received from the user 302 from a disapproval that is received from the user 302. Examples of the approval/disapproval identifier 256 include a software module, an ASIC, a PLD, etc. Upon determining that an approval is received from the user 302, the approval/disapproval identifier 256 sends a signal to a switch 258 to connect the memory device 254 to the communication device 208. A processor of the communication device 208 accesses the interactive object data 152A from the memory device 254 and sends the interactive object data 152A using the wired protocol or the wireless protocol to the HMD 102 for display of the interactive object 104A (FIG. 1B) in the interactive environment 122 (FIG. 1B). Examples of the switch 258 include one or more transistors, an ASIC, a PLD, a multiplexer, etc.

On the other hand, upon determining that a disapproval is received from the user 302, the approval/disapproval identifier 256 sends a signal to the switch 258 to connect the memory device 254 to the augmenter 164. The augmenter 164 accesses the interactive object data 152A from the memory device 254 and augments the interactive object data 152 with augmentation data to generate data for rendering the augmented interactive object 114A (FIG. 1C). The augmenter 164 provides the data for rendering the augmented interactive object 114A to the communication device 208. The communication device 208 sends the data for rendering the augmented interactive object 114A to the communication device of the HMD 102 by applying the wired or the wireless protocol. The communication device of the HMD 102 provides the data for rendering the augmented interactive object 114A to the processor of the HMD 102 for display of the augmented interactive object 114A in the augmented interactive environment 118.

Figure 2C:
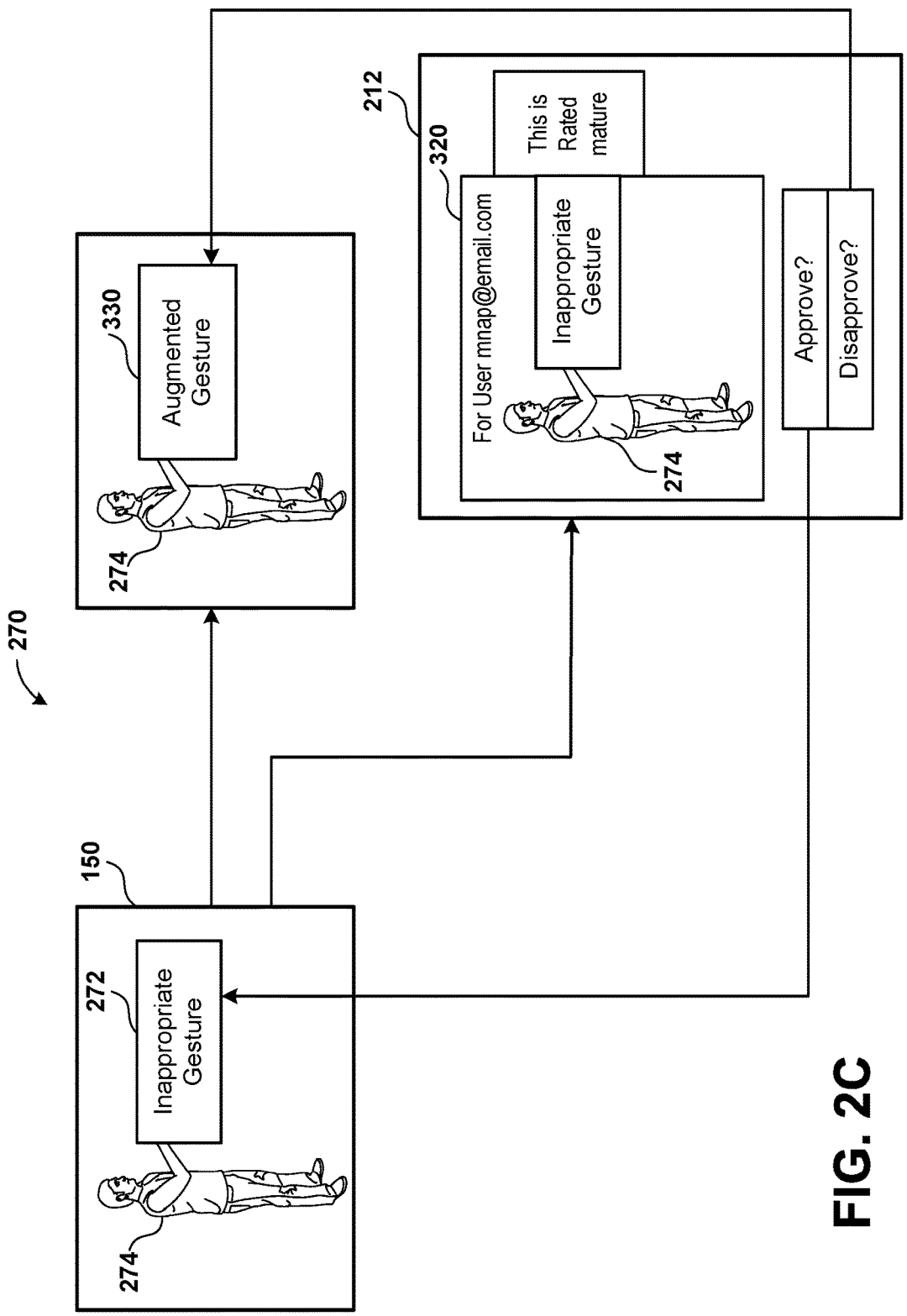
FIG. 2C is a diagram of a system for illustrating an effect of approval or disapproval by a user, in accordance with one embodiment of the present disclosure.

FIG. 2C is a diagram of an embodiment of a system 270 for illustrating an effect of approval or disapproval by the user 302 (FIG. 2A). The content processor 128 (FIG. 2A) of the game console 150 determines that a gesture 272 that is to be performed by an avatar 274 and to be displayed on the HMD 102 is inappropriate for the user 106 (FIG. 2A). For example, the content processor 128 determines that the gesture 272 is obscene or indecent when the gesture does not satisfy the threshold.

The content processor 128 sends information regarding the gesture 272 via the communication device 206 (FIG. 2A), the network 204 (FIG. 2A), and the communication device 209 (FIG. 2A) to the processor system 210 (FIG. 2A) of the computing device 202 (FIG. 2A) operated by the user 302. Examples of the information regarding the gesture 272 include a rating of the gesture 272, an email address of the user 106 to whom the gesture 272 is to be displayed on the HMD 102, an image of the gesture 272, a video of the gesture 272, etc. Moreover, a request for a decision whether to approve or disapprove a display of the gesture 272 is sent by the content processor 128 via the communication device 206, the network 204, and the communication device 209 to the processor system 210. The processor system 210 displays the information regarding the gesture 272 and the request for approval or disapproval via the display device 212 for viewing by the user 302.

The user 302 provides via an input device, e.g., a touchscreen, a keypad, a keyboard, a stylus, a button, etc., of the computing device 202 a response to the request to the processor system 210. When the response is of approval, the approval response is sent by the processor system 210 via the communication device 209, the network 204, and the communication device 206 to the content processor 128 and the content processor 128 determines not to augment the gesture 272 and sends the gesture 272 via the communication device 208 (FIG. 2A) of the game console 150 and a communication device of the HMD 102 to the processor of the HMD 102. The HMD 102 presents the gesture 272 on the HMD 102 to the user 106.

On the other hand, when the response is of disapproval, the disapproval response is sent by the processor system 210 via the communication device 209, the network 204, and the communication device 206 to the content processor 128 and the content processor 128 augments the gesture 272 with augmentation data to generate an augmented gesture 330. The augmented gesture 330 is sent by the content processor 128 via the communication device 208 (FIG. 2A) of the game console 150 and a communication device of the HMD 102 to the processor of the HMD 102. The HMD 102 presents the augmented gesture 330 instead of the gesture 272 on one or more display screens of the HMD 102.

In one embodiment, the information regarding the gesture 272 is converted from a three-dimensional format to a two-dimensional format by the content processor 128 before being displayed on a display screen of the client device 202. For example, the avatar 274 and the gesture 272 are displayed in a three-dimensional format on the HMD 102. The avatar 274 and the gesture 272 are modified from the three-dimensional format to a two-dimensional format by the content processor 128 to facilitate a display of the avatar 274 and the gesture 272 on a display screen of the client device 202. The conversion from the three-dimensional format to the two-dimensional format is executed to facilitate the information regarding the gesture 272 to be presented on a display screen of the client device 202 and to provide a focus of the information regarding the gesture 272 on the display screen.

In one embodiment, the information regarding the gesture 272 is converted from a three-dimensional format to a two-dimensional format by a processor of the processor system 210 and/or is re-sized to fit a display screen of the client device 202 before being displayed on the display screen.

In an embodiment in which the user 302 is using an HMD to interact with an environment while the user 106 is interacting with an environment, there is no need to re-size the information regarding the gesture 272 and/or convert the information regarding the gesture 272 from the three-dimensional format to the two-dimensional format. In the embodiment, the information regarding the gesture 272 is presented to the user 302 in the three-dimensional format and is of the same size as that presented on the HMD 102 worn by the user 106.

Figure 3A:
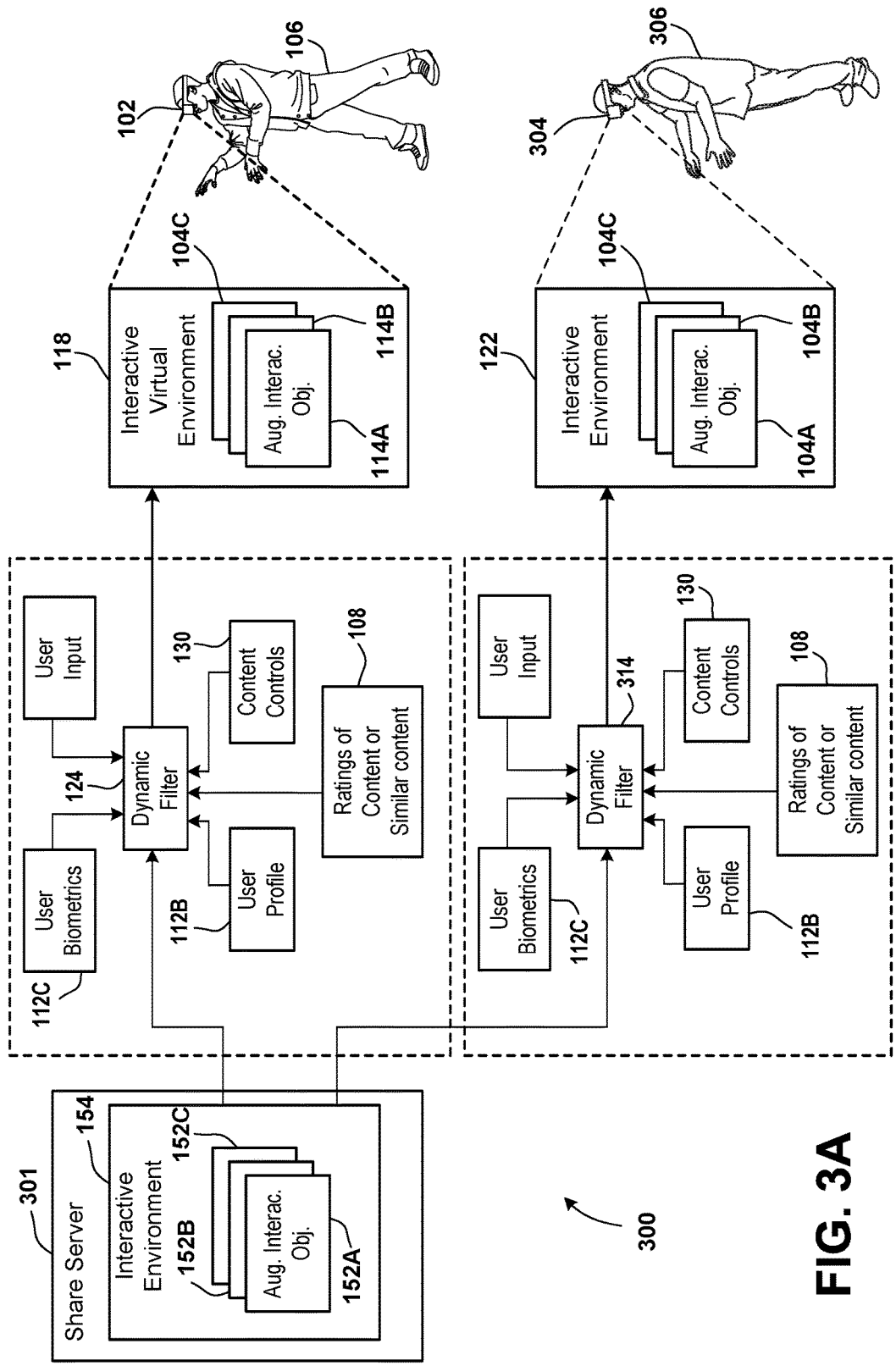
FIG. 3A is a diagram of a system to illustrate that a shared interactive environment is augmented for one user and is not augmented for another user, in accordance with one embodiment of the present disclosure.

FIG. 3A is a diagram of an embodiment of a system 300 to illustrate that the interactive environment 122 is augmented for one user 106 and is not augmented for another user 306. The system 300 includes a share server 301 that is connected via the network 204 (FIG. 2A) to the game console 150 and to a game console that is operated by the user 306. The share server 301 stores the interactive environment data 154 that is to be shared between the users 106 and 306. For example, after the user 106 provides login information to his/her user account and the login information is authenticated by an authentication server that is connected to the network 204, the share server 301 receives an indication of the authentication from the authentication server via the network 204 and sends the interactive environment data 154 to the content processor 128 of the game console 150 via the network 204. The content processor 128 determines whether the interactive environment data 154 satisfies the threshold. Upon determining that the interactive environment data 154 satisfies the threshold, the content processor 128 sends interactive environment data 154 to the processor of an HMD 102 that is worn by the user 106 on his/her head. The interactive environment data 154 is rendered to display the interactive environment 122 on the HMD 102. On the other hand, upon determining that the interactive environment data 154 does not satisfy the threshold, the content processor 128 augments the interactive environment data 154 with augmentation data, and sends the augmented interactive environment data to the processor of an HMD 102. The processor of the HMD 102 renders the augmented interactive environment data to display the augmented interactive environment 118 on the HMD 102.

Continuing with the example of the interactive environment data 154 that is to be shared between the users 106 and 306, the interactive environment data 154 includes interactive object data for representing the user 106. To illustrate, the interactive environment data 154 includes avatar data of an avatar whose skin is selected by the user 106 or has a default skin, and the user 106 controls movement of the avatar via an input, e.g., movement of the user 106, movement of hands of the user 106, a game controller that is held by the user 106, etc.

Continuing further with the example of the interactive environment data 154 that is to be shared between the users 106 and 306, the same interactive environment data 154 that is sent to the game console 150 is sent by the share server 301 to a game console that is operated by the user 306. To illustrate, the game console that is operated by the user 306 is in a real-world environment, e.g., a room, etc., in which the user 306 is located. As another illustration, the user 306 logs into his/her user account and the share server 301 sends the interactive environment data 154 via the network 204 to the game console that is operated by the user 306. The interactive environment data 154 includes an interactive object that represents the user 106. For example, the interactive environment data 154 includes interactive object data for representing the user 306. To illustrate, the interactive environment data 154 includes avatar data of an avatar whose skin is selected by the user 306 or has a default skin, and the user 306 controls movement of the avatar via an input, e.g., movement of the user 306, movement of hands of the user 306, a game controller that is held by the user 306, etc.

Continuing with the example of the interactive environment data 154 that is to be shared between the users 106 and 306, a dynamic filter 314 of the game console that is operated by the user 306 uses biometric information regarding the user 306 received from the user biometric server 112C, and/or uses profile information regarding the user 306 received from the user profile server 112B, and/or uses a rating of the interactive environment 122 or an interactive environment similar to the interactive environment 122 from the ratings server 108, and/or uses a type of the interactive environment 122 or an interactive environment similar to the interactive environment 122 from the ratings server 108, and/or uses a content control level set by an administrator of the user 306, and/or users a content type level set by the administrator of the user 306 to determine whether the interactive environment data 154 satisfies a threshold for the user 306. The dynamic filter 314 is the same in structure and function as that of the dynamic filter 124 except that the dynamic filter 314 is located in the game console that is operated by the user 306. The administrator of the user 306 is a parent of the user 306 or a guardian of the user 306. Upon determining that the interactive environment data 154 satisfies the threshold for the user 306, a content processor within the dynamic filter 314 determines to provide the interactive environment data 154 to the HMD 304 without augmenting the interactive environment data 154. The content processor of the dynamic filter 314 sends the interactive environment data 154 for rendering the interactive environment 122 to a communication device of the game console that is operated by the user 306. The communication device of the game console that is operated by the user 306 applies the wired protocol or the wireless protocol to send the interactive environment data 154 to a communication device of the HMD 304. A processor of the HMD 304 receives the interactive environment data 154 from the communication device of the HMD 304 and applies a rendering program to the interactive environment data 154 to display the interactive environment 122 on one or more display screens of the HMD 304.

In one embodiment, both the HMDs 102 and 304 communicate with the game console 150 that is operated by both the users 102 and 304, e.g., both the user 106 and 304 use the game console 150 that is located in a real-world environment in which both the users 102 and 304 are located, etc. For example, the game console 150 receives the interactive environment 154 and determines whether to augmented the interactive environment data 154 for each of the users 106 and 306.

In an embodiment, the interactive program, e.g., a computer software program code, a game code, an interactive environment data generation code, etc., is stored on the share server 301 for server-based gaming. The interactive program is executed by a processor of the share server 301 to determine interactive environment data to be presented on one or more HMDs, e.g., the HMD 102 and the HMD 304.

In one embodiment, the interactive program is stored on the game console 150 and is executed by a processor of the game console 150 to determine interactive environment data to be presented on the HMD 102 that is in communication with the game console via the wired or wireless protocol. Moreover, the interactive environment data is sent from a communication device of the game console 150 to the share server 301 for sharing with other game consoles, e.g., the game console that is operated by the user 306, etc.

Figure 3B:
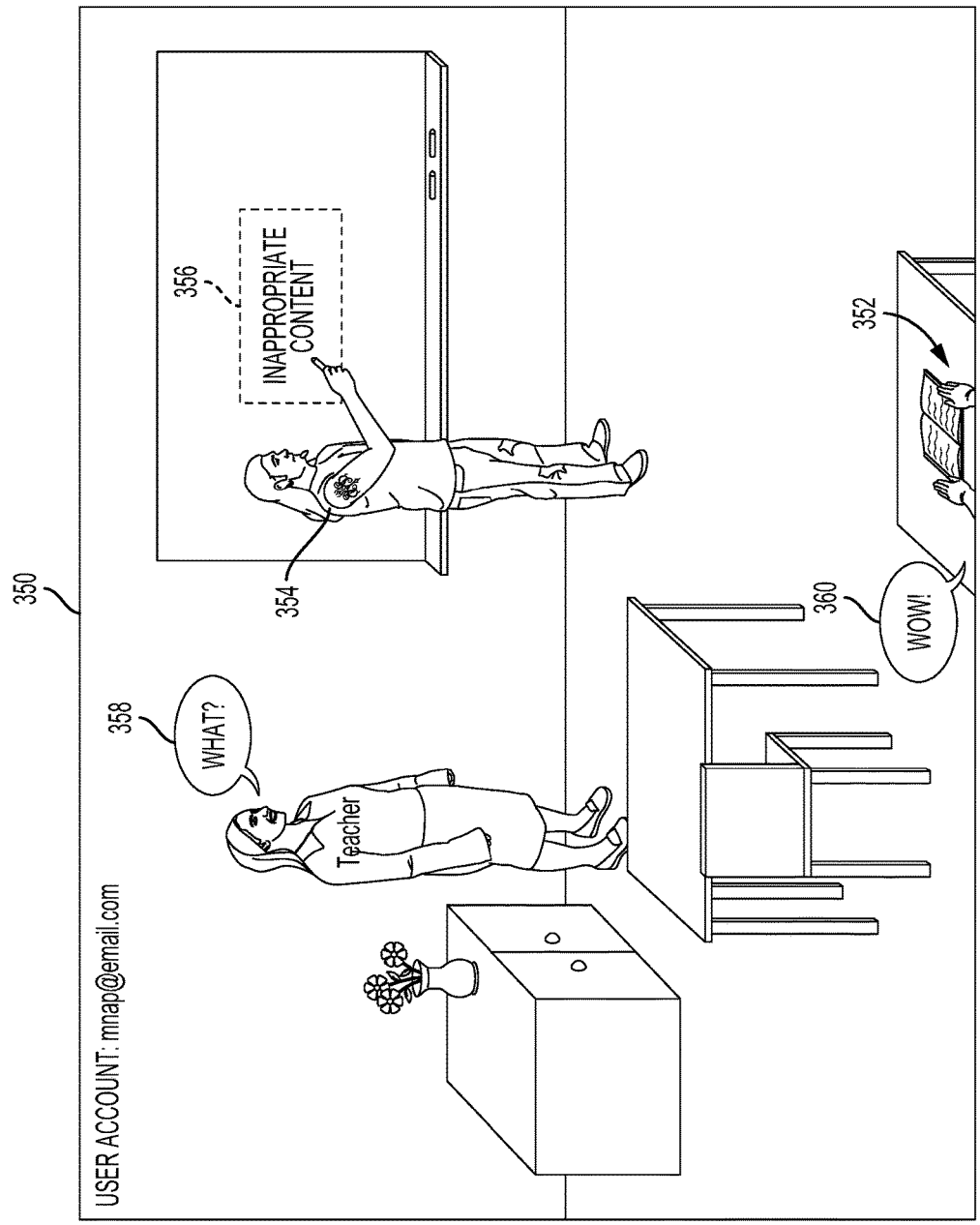
FIG. 3B is a diagram of a display device of a head-mounted display (HMD) to illustrate interactive data that is not augmented according to a threshold, in accordance with one embodiment of the present disclosure.

FIG. 3B is a diagram of an embodiment of a display device 350 of the HMD 102 (FIG. 2A). The display device 350 is about to display a classroom environment, which is an example of the interactive environment 122 (FIG. 2A). In the classroom environment, hands 352 of an avatar that represents the user 106 (FIG. 2A) and an avatar 354 represents the user 306 (FIG. 3A), which whom the user 106 is about to share the classroom environment, are shown. The user 106 is about to view the classroom environment on the HMD 102 and the user 306 is about to view the classroom environment on the HMD 304 (FIG. 3A).

Movement of the hands 352 is controlled by the user 106 and movement of the avatar 354 is controlled by the user 306. For example, as the user 106 moves his/her hands with respect to a camera, e.g., camera of the game console 150, camera of the HMD 102, independently-located camera in a room in which the user 106 is located, etc., the camera captures image data of the hands. The image data is provided from the camera to the game console 150 and the content processor 128 determines positions of the hands 352 from the image data. The positions are provided by the content processor 128 to the processor of the HMD 102 for display on the HMD 102.

A professor avatar, which is displayed in the classroom environment, is controlled by yet another user or by a content processor of a game console. The avatar 354 is about to write inappropriate content, e.g., content that does not satisfy a threshold, etc., and the avatar 354 has an indecent look and feel for the classroom environment, e.g., has a look and feel that does not satisfy a threshold, etc. For example, the interactive program is executed by a content processor or a server to allow the avatar 354 to write content a classroom board when the avatar 354 is at a location of the classroom board interactive object of the classroom environment. As another example, the user 306 controls a hand of the avatar 354 via an input device, examples of which are provided herein, to write the inappropriate content 356 on the classroom board. To illustrate, the user 306 moves his/her hand and positions of the hand are captured by a camera, e.g., a digital camera within the game console operated by the user 306, a digital camera within the HMD 304 (FIG. 3A) worn by the user 306, an independently-located camera in a real-world environment in which the user 306 is located, etc. The positions of the hand are analyzed by the content processor of the game console operated by the user 306 to determine a position of a hand of the avatar 354. The position of the hand of the avatar 354 has the same movement within the classroom environment as that of the user 306 in a real-world environment in which the user 306 is located.

The inappropriate content is an example of an interactive object 356. Moreover, an interactive object 358 that includes an interrogative remark "What?" made by the professor avatar is about to be displayed when the interactive object 356 having the inappropriate content will be displayed, and an interactive object 360 is about to be displayed when the interactive object 356 having the inappropriate content will be displayed. The interactive object 360 includes an exclamatory remark "Wow!" made by an avatar that represents the user 102 and whose hands 352 are visible in FIG. 3B.

The content processor 128 of the game console 150 determines that each of avatar 354, the interactive object 356, and the interactive object 358 do not satisfy the threshold for display on the HMD 102 (FIG. 2A) for the user 106 and determines that the interactive object 360 satisfies the threshold for the user 106.

FIG. 3C is a diagram of an embodiment of the display device 350 of the HMD 102 on which a different classroom environment is displayed that the classroom environment shown in FIG. 3B. In the classroom environment of FIG. 3C, the interactive object 212 with text "Nice!" is displayed when the content processor 128 (FIG. 2A) of the game console 150 (FIG. 2A) augments data for displaying the interactive object 358 (FIG. 3B) with augmentation data. Moreover, in the classroom environment of FIG. 3C, an avatar 216 that has decent clothes, e.g., clothes that satisfy the threshold, etc., and decent look and feel, e.g., decent haircut, look and feel that satisfies the threshold, etc., is displayed when the content processor 128 (FIG. 2A) of the game console 150 (FIG. 2A) augments data for displaying the avatar 354 (FIG. 3B) with augmentation data. Also, in the classroom environment of FIG. 3C, the interactive object 214 that has a formula "$E=mC^2$", e.g., text that satisfies the threshold, etc., is displayed when the content processor 128 (FIG. 2A) of the game console 150 (FIG. 2A) augments data for displaying the interactive object 356 (FIG. 3B) with augmentation data.

It should be noted that in a shared environment in which the classroom environment is displayed on the HMD 304 (FIG. 3A) worn by the user 306, the content processor of the game console that is operated by the user 306 determines whether the interactive objects 356, 358, 360 and the avatar 354 are to be replaced other interactive objects for the user 306, e.g., whether the interactive objects 356, 358, 360 and the avatar 354 satisfy a threshold for the user 306, etc. Upon determining that the interactive objects 356, 358, 360 and the avatar 354 are not to be replaced, the processor of the game console that is operated by the user 306 sends classroom environment data to the HMD 304 worn by the user 306 to display the classroom environment shown in FIG. 3B on the HMD 304 to the user 306.

Figure 4:
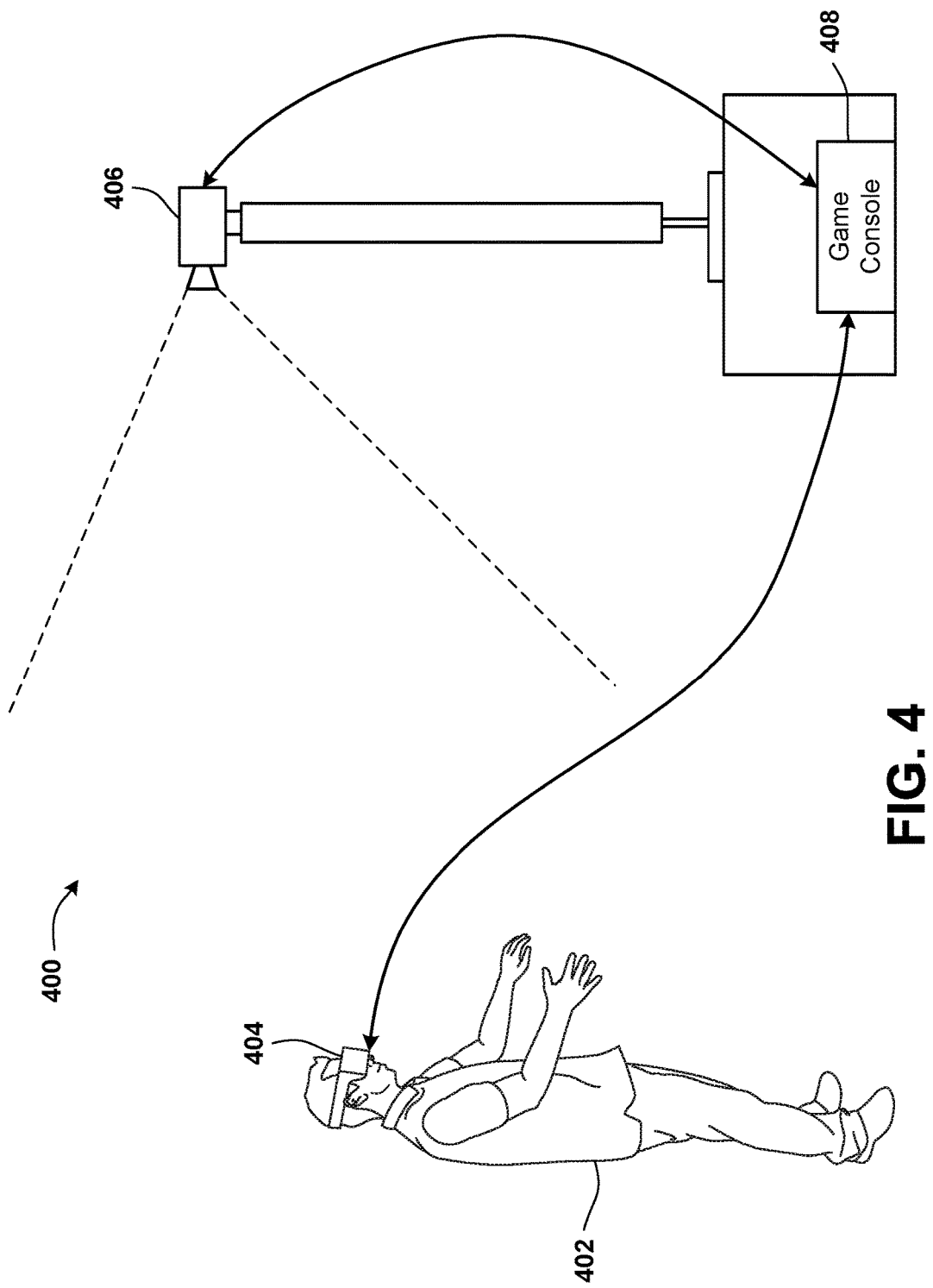
FIG. 4 is a diagram of a system to illustrate use of a camera to capture positions of a body part of a user, in accordance with one embodiment of the present disclosure.

FIG. 4 is a diagram of an embodiment of a system 400 to illustrate use of a camera to capture positions of a body part, e.g., hands, legs, feet, head, etc., of a user 402. The user 402 is an example of the user 106 (FIG. 3A) or of the user 306 (FIG. 3A). The user 402 is wearing an HMD 404 to cover his/her eyes with one or more display screens of the HMD 404. The HMD 404 is an example of the HMD 102 (FIG. 3A) or of the HMD 304 (FIG. 3A).

In an embodiment, the user 402 is holding and operating a controller, e.g., a joystick, a hand-held controller, a keyboard, a stick controller, a sword controller, a gun controller, a glove controller, etc., to provide input to a game console 408 for changing an interactive environment displayed on the HMD 404. The game console 408 is an example of the game console 150 (FIG. 2A) or of the game console that is operated by the user 306 (FIG. 3A).

A camera 406, e.g., a depth camera, a digital camera, etc., captures images of the body part, the controller, and/or the HMD 404, and provides image data regarding positions of the body part, the controller, and/or the HMD 404 to the game console 408, e.g., using the wired or wireless protocol, etc. A processor, e.g., the content processor 128 (FIG. 2A), etc., of the game console 408 analyzes the image data to determine positions of the body part, the controller, and/or the HMD 404. Based on the positions, the processor of the game console 408 determines by executing the interactive program whether interactive environment data used to display an interactive environment that is displayed within the HMD 404 is to be modified. The interactive environment is about to be displayed on the HMD 404.

Upon determining that the interactive environment data is to be modified, the processor of the game console 408 modifies the interactive environment data to generate modified interactive environment data. The processor of the game console 408 sends the modified interactive environment data to a communication device of the game console 408. The communication device of the game console 408 applies the wired or the wireless protocol to send the modified interactive environment data to a communication device of the HMD 404. A processor of the HMD 404 applies a rendering program to the modified interactive environment data to display a modified interactive environment on one or more display screens of the HMD 404.

On the other hand, upon determining that the interactive environment data is not to be modified, the processor of the game console 408 does not modify the interactive environment data and a display of an interactive environment on the HMD 404 that is currently being presented on the HMD 404 continues.

In one embodiment, the camera 406 is located within the game console 408 or is attached to the HMD 404.

Figure 5:
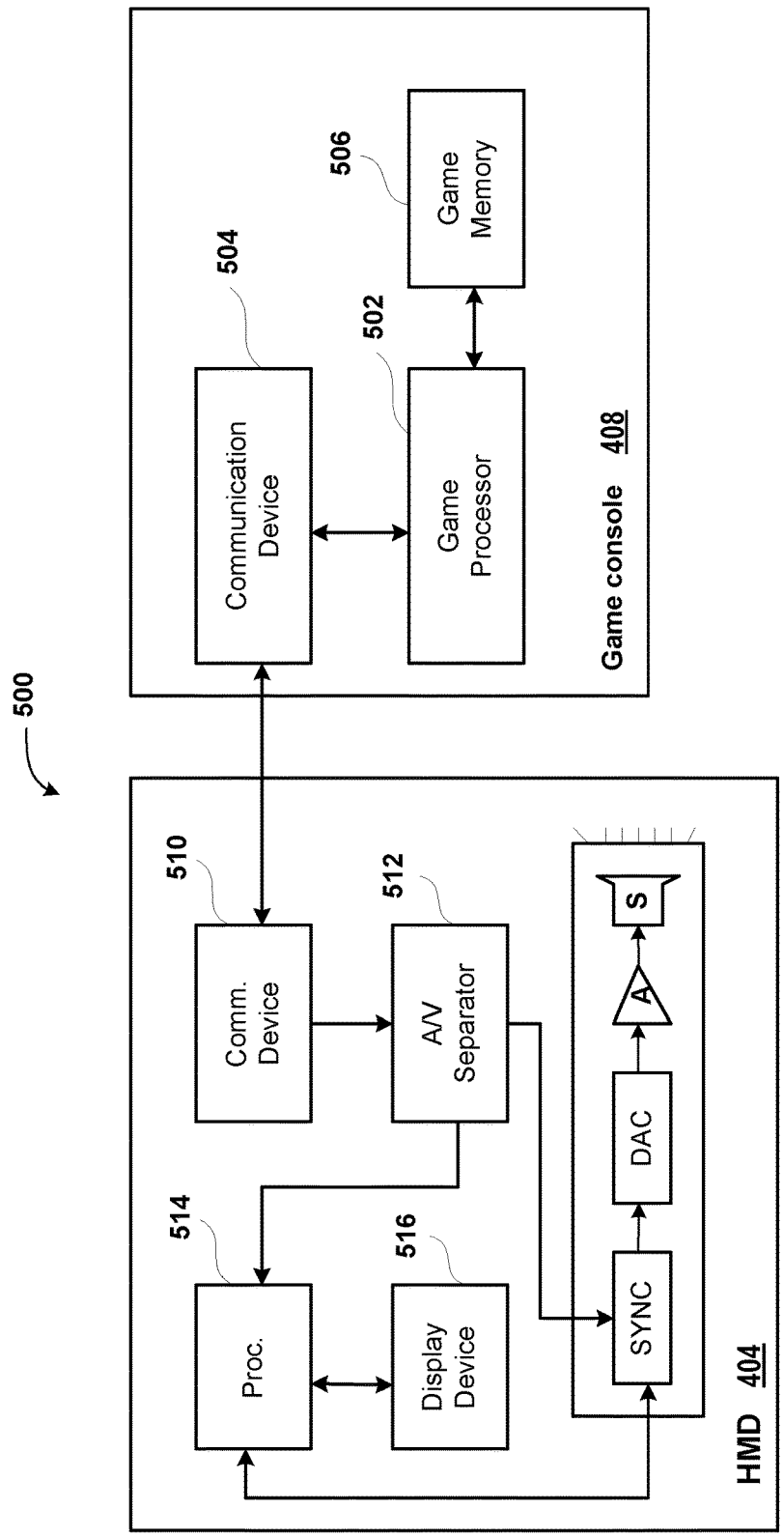
FIG. 5 is a diagram of a system to illustrate use of audio data or image data as interactive environment data, in accordance with one embodiment of the present disclosure.

FIG. 5 is a diagram of an embodiment of a system 500 to illustrate use of audio data or image data as interactive environment data. The system 500 includes the HMD 404 and the game console 408. The game console 408 includes a game processor 502, a game communication device 504, and a game memory 506. The game processor 502 is an example of the content processor 128 (FIG. 1B). The game processor 506 accesses interactive environment data, e.g., data that includes interactive object data, interactive object data, audio data, image data, video data, etc., from the game memory 516 and provides the interactive environment data to the communication device 504. The interactive environment data that is accessed is unaugmented or augmented interactive environment data. The communication device 504 applies the wired protocol or the wireless protocol to the interactive environment data and sends the interactive environment data to a communication device 512 of the HMD 404.

The communication device 512 applies the wired or wireless protocol to receive the interactive environment data from the communication device 512 and provides the interactive environment data to an audio/video separator 512, e.g., an audio extractor, etc., of the HMD 404. The audio/video separator 512 separates audio data from image data, both of which are included in the interactive environment data, sends the image data to a processor 514 of the HMD 404 and sends the audio data to a synchronizer, which is illustrated as "SYNC" in FIG. 5. The image data is rendered by the processor 514 for display on a display device 516 of the HMD 404. The display device 516 is an example of a display device of the HMD 102 (FIG. 3A) or of the HMD 304 (FIG. 3A). The synchronizer synchronizes a playback of sound with that of a display of one or more interactive objects. For example, the synchronizer schedules for playing sound at the same time as an interactive object is displayed at a position and/or an orientation and/or as having a color and/or as having a shape and/or as having a texture. The synchronizer sends the synchronized audio data to a digital to analog converter (DAC) that converts the audio data from a digital format into an analog format. The analog audio data is amplified by an amplifier (A). The amplified analog audio data is converted into sound by one or more speakers (S).

It should be noted that in one embodiment, any embodiment described herein is combined with any other embodiment described herein.

In one embodiment, a user, as used herein, identifies a user account that the user accesses. For example, the user 106 accesses a user account assigned to the user 106 and the user 302 accesses another user account assigned to the user 302.

In one embodiment, any of the functions described herein as being performing by a processor of a game console, e.g., the game console 150 (FIG. 1C), the game console operated by the user 306 (FIG. 3A), etc., are performed instead by a server that is connected via the network 204 to the game console. For example, server-based gaming is used to display a game on an HMD. The server provides data for rendering an interactive environment via the game console to an HMD for rendering on the HMD or provides data for rendering the interactive environment to the HMD without using the game console. As another example, parts of the game console 150 are implemented within a server.

In an embodiment, any of the functions described herein as being performing by a processor of a game console, e.g., the game console 150 (FIG. 1C), the game console operated by the user 306 (FIG. 3A), etc., are performed instead by an HMD. For example, parts of the game console 150 are implemented within the HMD 102. The HMD 102 is connected to servers, described herein, via the network 204.

In one embodiment, any of the functions described herein as being performing by a processor of a game console, e.g., the game console 150 (FIG. 1C), the game console operated by the user 306 (FIG. 3A), etc., are performed instead by a combination of the game console, an HMD, and a server connected via the network 204 to the game console.

In an embodiment, the systems and methods, described herein, enables a user to create skins for his/her character or characters in an environment, based on content being present in an HMD. If the HMD content is immersive and places the user in real scene environments, the user of the HMD may wish to customize his avatar or parts of himself that he sees in the HMD or an avatar of another user or parts of the avatar of the other user. The skins will transport look and feel of an avatar, without changing functionality of the avatar. For instance, the skins transform an avatar into a cartoon, or transform an environment into black-white (e.g., like an old movie). The system provides filters that the user sets via the HMD, so that changes between skins are enabled.

In an embodiment, users create skins, modify existing skins, create user generated skins that are shared, and skins that are shared with other users based on a type of content being viewed in an HMD. The skins are shared or found on a site or accessed via a content finder via the HMD. The skins have various ratings, such as adult ratings, children ratings, etc.

In one embodiment, parental controls are provided so that certain skins are accessible after parent approval. For example, a message is generated and sent to a parent asking for approval of a skin for a child, in a particular game. In other examples, some skins are pre-filtered so children cannot see certain skins. As yet another example, parental filtering is executed automatically by an HMD, e.g., by measuring the age of the user by examination of eyes of the user, etc. One way is to measure the eye separation is to compare the eye separation with the parent's eye separation or to by using models that tell if the HMD user is a child or adult.

In an embodiment, when content changes in a virtual world, an HMD system automatically pauses or sends a notice to a user that parental authorization is needed. This is automated to trigger the pause and authorization if the user is detected to not be an adult, such as by eye scans, voice detection, historical use patterns, or pre-defined user settings (e.g., by the parent). Also, clips of content that are believed to need authorization are sent to the parent. The system intelligently identifies the clips or image frames for viewing by the parent or guardian, before progression of the HMD content. For example, the clips are automatically sized so that the images or clips are sent to the parent's smart phone and viewed, which is usually hard given that the HMD content is in 3D. Thus, if the parent approves, the approval is sent to a server and the server then allows the child to continue. If approval is not received, then the user is provided with an alternate user experience. In this manner, the parent monitors content to be viewed by the child without having to wear the HMD that the child is wearing.

In one embodiment, the parent identifies types of content that he/she does not approve of, which triggers the sending for approval to the parent. The types of content can be generic types or classes, so that the rules can be shared across different types of HMD content.

In an embodiment, one of the systems and methods described herein, allows users to rate content, parts of content, particular scenes, particular images, or audio, and use this to augment a rating of the content. This allows the system to identify what content in particular scenes would be risky to show to particular children.

In one embodiment, a plug-in is used, so that users get social feedback regarding content. Raters of the content can also be graded.

In an embodiment, filters are by parents, so that content is pre-filtered dynamically. If content in an HMD is being viewed, e.g., for a particular scene, certain content can be replaced with child rated content, so that most of the interactive experience remains substantially the same. The same is done for language filtering, based on the parental settings. The filters are associated to gestures, so that certain inappropriate gestures are filtered or blocked or replaced with different content.

Figure 6:
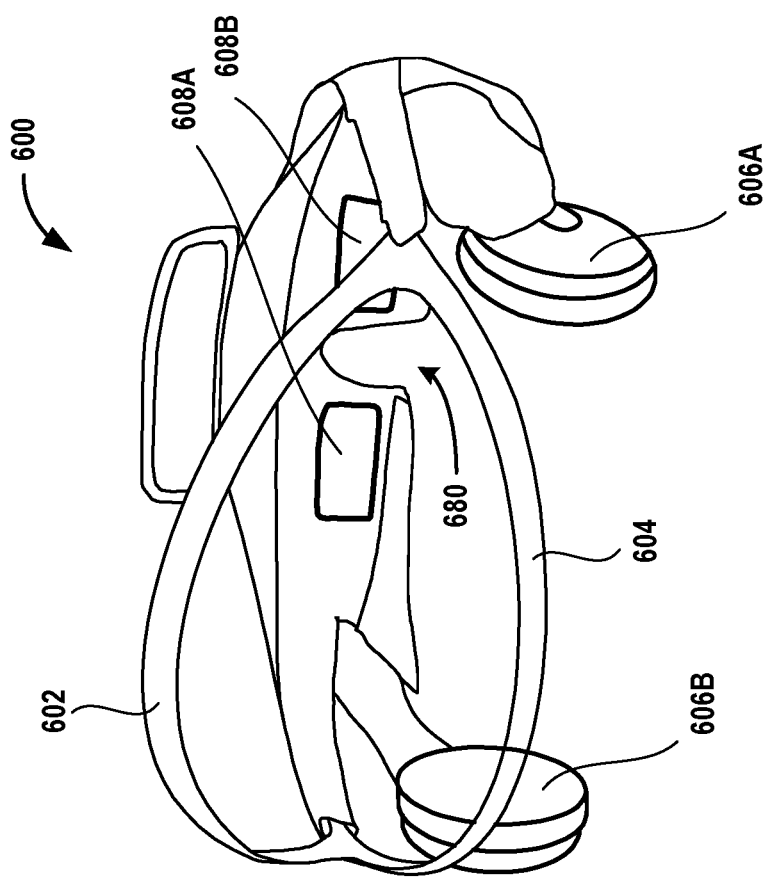
FIG. 6 is an isometric view of an HMD, in accordance with one embodiment of the present disclosure.

FIG. 6 is an isometric view of an HMD 600, which is an example of the HMD 404. The HMD 600 includes bands 602 and 604 that go to the back of the head of the user 402 when worn by the user 402. Moreover, the HMD 600 includes earphones 606A and 606B, e.g., speakers, etc., that emanate sound associated with an interactive environment, e.g., a game environment, an interactive tour environment, etc., that is presented by execution of the interactive program, e.g., a game program, an interactive environment generation program, etc. The HMD 600 includes lenses 608A and 608B that allows the user 402 (FIG. 5) to view an interactive environment that is displayed on a display screen of the HMD 600. A groove 680 rests on a nose of the user 402 to support the HMD 600 on the nose.

In some embodiments, the HMD 600 is worn by the user 402 in a manner similar to which sunglasses, glasses, or reading glasses are worn by the user 402.

Figure 7:
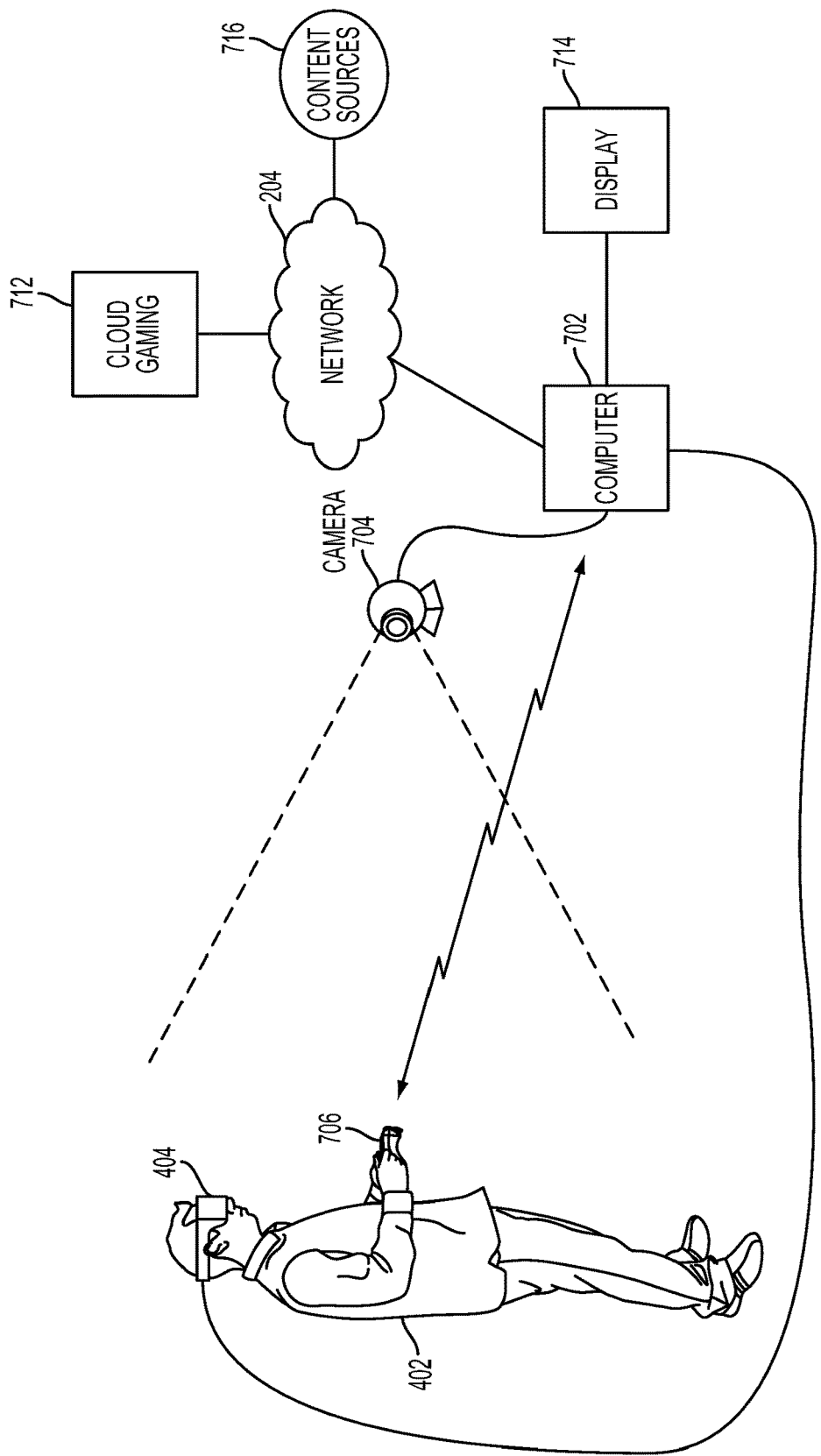
FIG. 7 illustrates a system for interactive game play of a video game, in accordance with one embodiment of the present disclosure.

FIG. 7 illustrates a system for interactive game play of a video game, in accordance with an embodiment described in the present disclosure. The user 402 is shown wearing the HMD 404. The HMD 404 is worn in a manner similar to glasses, goggles, or a helmet, and is configured to display a video game or other content to the user 402. The HMD 404 provides an immersive experience to the user 402 by virtue of its provision of display mechanisms (e.g., optics and display screens) in close proximity to the user's eyes and the format of content that is delivered to the HMD 404. In one example, the HMD 404 provides display regions to each of the user's eyes which occupy large portions or even the entirety of the field of view of the user 402. As another example, the user 402 feels as if he/she is in, e.g., is a part of, etc., an interactive environment that is displayed on the HMD 404.

In one embodiment, the HMD 404 is connected to a computer 702. The connection to computer 702 can be wired or wireless. The computer 702, in one embodiment, is any general or special purpose computer, including but not limited to, a game console, a personal computer, a laptop, a tablet, a mobile device, a smart phone, a tablet, a thin client, a set-top box, a media streaming device, a smart television, etc. In some embodiments, the HMD 404 can connect directly to the Internet, which may allow for cloud gaming without the need for a separate local computer. In one embodiment, the computer 702 is configured to execute a video game (and other digital content), and output the video and audio from the video game for rendering by the HMD 404.

The computer 702 may, in some embodiments, is a local or remote computer, and the computer runs emulation software. In a cloud gaming embodiment, the computer 702 is remote and may be represented by a plurality of computing services that may be implemented in data centers, where game systems/logic is employed and distributed to the user 402 over a computer network.

The user 402 operates a hand-held controller 706 to provide input for an interactive environment. In one example, a camera 704 is configured to capture images of a real-world environment in which the user 402 is located. These captured images are analyzed to determine a location and movements of the user 402, the HMD 404, and the controller 706. In one embodiment, the controller 706 includes a light, or lights, which are tracked to determine its location and orientation. Additionally, as described in further detail below, in one embodiment, the HMD 404 includes one or more lights, which are tracked as markers to determine the location and orientation of the HMD 404 in substantial real-time during a display of an interactive environment.

The camera 704, in one embodiment, includes one or more microphones to capture sound from the real-world environment. Sound captured by a microphone array is processed to identify the location of a sound source. Sound from an identified location is selectively utilized or processed to exclusion of other sounds not from the identified location. Furthermore, in one embodiment, the camera 704 included multiple image capture devices, e.g., stereoscopic pair of cameras, an infrared (IR) camera, a depth camera, and combinations thereof.

In some embodiments, the computer 702 executes games locally on the processing hardware of the computer 702. The games or content is obtained in any form, such as physical media form (e.g., digital discs, tapes, cards, thumb drives, solid state chips or cards, etc.) or by way of download from the network 204. In an embodiment, the computer 702 functions as a client in communication over the network 204 with a cloud gaming provider 712. The cloud gaming provider 712 maintains and executes the video game being played by the user 402. The computer 702 transmits inputs from the HMD 404, the controller 706, and/or the camera 704, to the cloud gaming provider 712, which processes the inputs to affect the game state of the video game being executed. The output from the executing video game, such as video data, audio data, and haptic feedback data, is transmitted to the computer 702. The computer 702 further processes the data before transmission or directly transmits the data to the relevant devices. For example, video and audio streams are provided to the HMD 404, whereas a vibration feedback command is provided to the controller 706.

In one embodiment, the HMD 404, controller 706, and camera 704, are networked devices that connect to the network 204 to communicate with the cloud gaming provider 1013. For example, the computer 702 may be a local network device, such as a router, that does not otherwise perform video game processing, but facilitates passage of network traffic. The connections to the network 204 by the HMD 404, controller 706, and camera 704 are wired or wireless. In some embodiments, content executed on the HMD 404 or displayable on a display device 714, is obtained from any of content sources 716. Example content sources can include, for instance, internet websites that provide downloadable content and/or streaming content. In some examples, the content can include any type of multimedia content, such as movies, games, static/dynamic content, pictures, social media content, social media websites, interactive tour content, cartoon content, etc.

In one embodiment, the user 402 is playing a game on the HMD 404, where such content is immersive three-dimensional (3D) interactive content. The content on the HMD 404, while the user 402 is playing, is shared to the display device 714. In one embodiment, the content shared to the display device 714 allows other users proximate to the user 402 or remote to watch along with game play of the user 402. In still further embodiments, another player viewing the game play of user 402 on the display device 714 participates interactively with user 402. For example, a user viewing the game play on the display device 714 controls characters in the game scene, provides feedback, provides social interaction, and/or provides comments (via text, via voice, via actions, via gestures, etc.,) which enables the user who is not wearing the HMD 404 to socially interact with the user 402.

Figure 8:
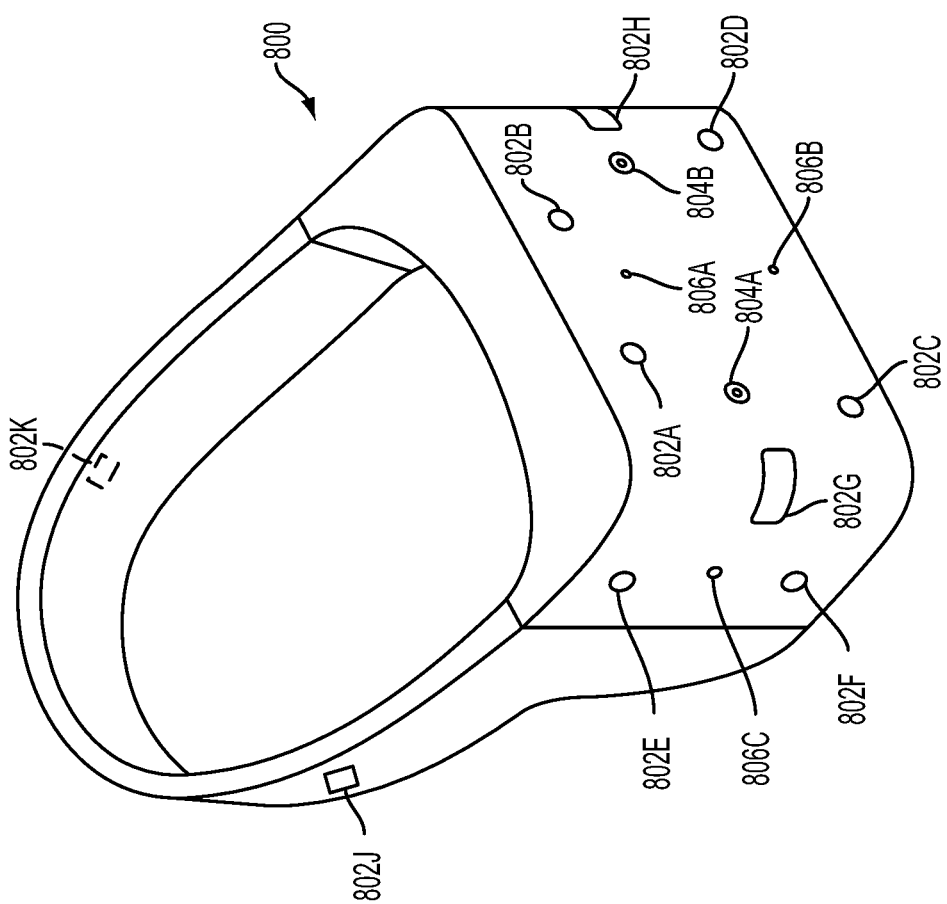
FIG. 8 illustrates an HMD, in accordance with an embodiment described in the present disclosure.

FIG. 8 illustrates a head-mounted display (HMD) 800, in accordance with an embodiment described in the present disclosure. The HMD 800 is an example of the HMD 404 (FIG. 4). As shown, the HMD 800 includes a plurality of lights 802A-H, J and K (e.g., where 802K and 802J are located toward the rear or backside of the HMD headband). Each of these lights is configured to have specific shapes and/or positions, and is configured to have the same or different colors. The lights 802A, 802B, 802C, and 802D are arranged on the front surface of the HMD 800. The lights 802E and 802F are arranged on a side surface of the HMD 800. And the lights 802G and 802H are arranged at corners of the HMD 800, so as to span the front surface and a side surface of the HMD 800. It will be appreciated that the lights are identified in captured images of an interactive environment in which a user uses the HMD 800.

Based on identification and tracking of the lights, the location and orientation of the HMD 800 in the interactive environment is determined. It will further be appreciated that some of the lights are or are not visible depending upon the particular orientation of the HMD 800 relative to an image capture device, e.g., a camera, a digital camera, a depth camera, an infrared camera, etc. Also, different portions of lights (e.g. lights 802G and 802H) are exposed for image capture depending upon the orientation of the HMD 800 relative to the image capture device. In some embodiments, inertial sensors are disposed in the HMD 800, which provide feedback regarding positioning, without the need for lights. In some embodiments, the lights and inertial sensors work together, to enable mixing and selection of position/motion data.

In one embodiment, the lights are configured to indicate a current status of the HMD 800 to others users in a real-world environment. For example, some or all of the lights have a color arrangement, an intensity arrangement, blink, have an on/off configuration, or other arrangement indicating a current status of the HMD 800. By way of example, the lights display different configurations during active game play of a video game (generally game play occurring during an active timeline or within a scene of the game) versus other non-active game play aspects of a video game, such as navigating menu interfaces or configuring game settings (during which the game timeline or scene is inactive or paused).

In an embodiment, the lights are also configured to indicate relative intensity levels of game play. For example, the intensity of lights, or a rate of blinking, increases when the intensity of game play increases.

The HMD 800, in one embodiment, additionally includes one or more microphones. In the illustrated embodiment, the HMD 800 includes microphones 804A and 804B located on the front surface of the HMD 800, and a microphone located on a side surface of the HMD 800. By utilizing an array of microphones, sound from each of the microphones is processed to determine a location of the sound's source. This information is utilized in various ways, including exclusion of unwanted sound sources, association of a sound source with a visual identification, etc.

The HMD 800 includes one or more image capture devices. In the illustrated embodiment, the HMD 800 is shown to include image capture devices 806A and 806B. In an embodiment, by utilizing a stereoscopic pair of image capture devices, 3D images and video of a real-world environment in front of the HMD 800 is captured from the perspective of the HMD 800. Such video is presented to the user 402 to provide the user with a "video see-through" ability while wearing the HMD 800. That is, though the user 402 cannot see through the HMD 800 in a strict sense, the video captured by the image capture devices 806A and 806B nonetheless provides a functional equivalent of being able to see the real-world environment external to the HMD 800 as if looking through the HMD 800.

Such video, in one embodiment, is augmented with interactive elements to provide an augmented reality experience, or is combined or blended with interactive elements in other ways. Though in the illustrated embodiment, two cameras are shown on the front surface of the HMD 800, it will be appreciated that there may be any number of externally facing cameras or a single camera can be installed on the HMD 800, and oriented in any direction. For example, in another embodiment, there may be cameras mounted on the sides of the HMD 800 to provide additional panoramic image capture of the environment.

Figure 9:
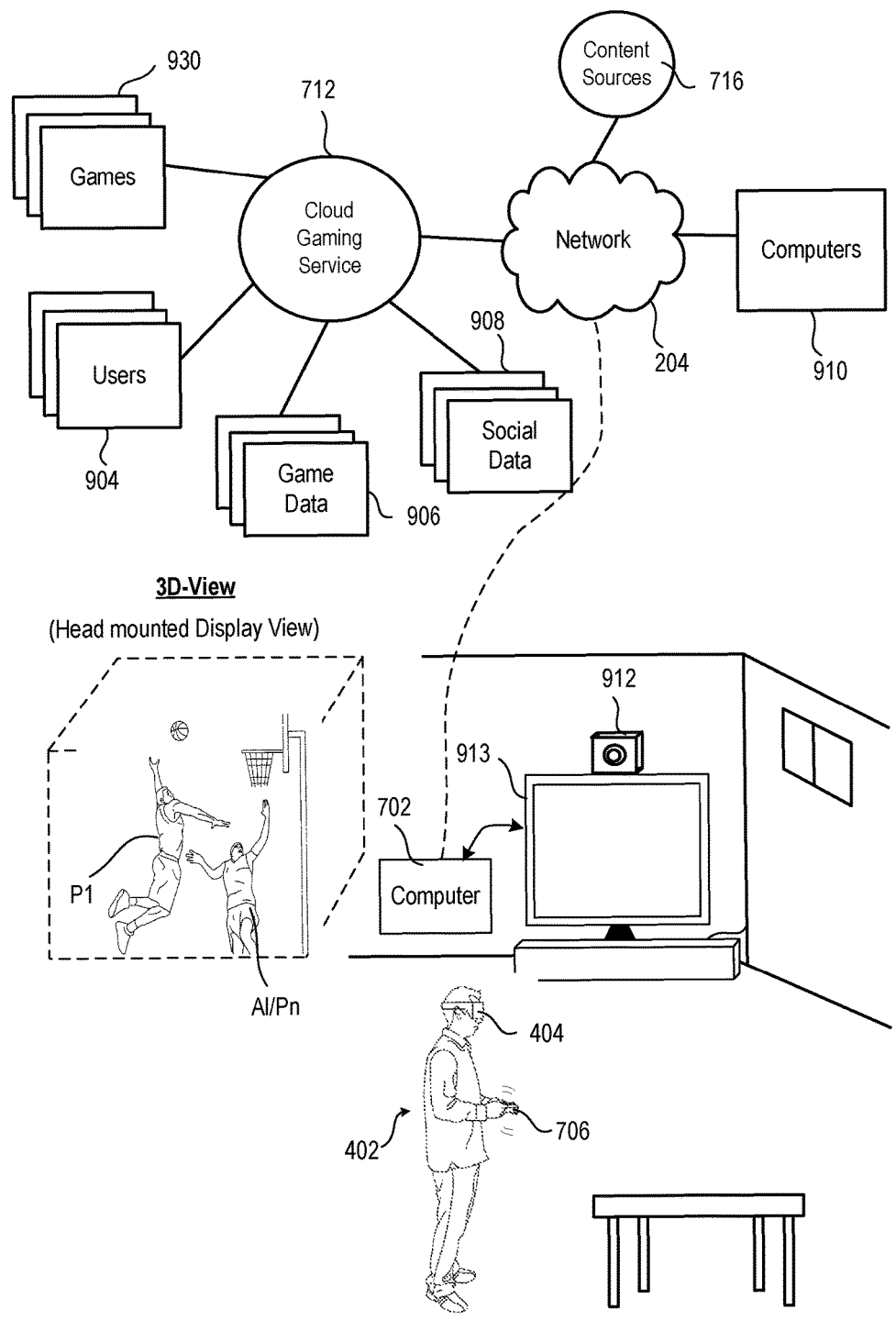
FIG. 9 illustrates one example of game play using a client system that is capable of rendering video game content to an HMD of a user, in accordance with one embodiment of the present disclosure.

FIG. 9 illustrates one example of game play using the computer 702 that is capable of generating and providing video game content to the HMD 800 of the user 402 for rendering on the HMD 800. In this illustration, a state of an interactive object, e.g., game content, etc., provided to the HMD 800 is in a rich interactive 3-D space. As discussed above, a state of an interactive object is downloaded to the computer 702 or is executed in one embodiment by a cloud processing system. The cloud gaming service 712 includes a database of users 904, which are allowed to access particular games 930, share experiences with other friends, post comments, and manage their account information.

The cloud gaming service 712 stores game data 906 for specific users, which and the game data is usable during game play, for future game play, for sharing to a social media network, or used for storing trophies, awards, status, ranking, etc. Social data 908 is managed by cloud gaming service 712. In one embodiment, the social data 908 is managed by a separate social media network, which is interfaced with the cloud gaming service 712 over the network 204. Over the network 204, any number of computers 910 is connected for access to the content and interaction with other users.

Continuing with the example of FIG. 9, the three-dimensional interactive scene viewed in the HMD 800 includes game play, such as the characters illustrated in the 3-D view, or another interactive environment. One character, e.g. P1, etc., is controlled by the user 402 that is wearing the HMD 800. This example shows a basketball scene between two players, wherein the HMD user 402 is dunking a ball on another character in the 3-D view. The other character can be an AI (artificial intelligence) character of the game, or can be controlled by another player or players (Pn). User 402, who is wearing the HMD 800, is shown moving about in a space of use, where the HMD 800 moves around based on the user's head movements and body positions. A camera 912 is shown positioned over a display screen in the room, however, for HMD use, the camera 912 can be placed in any location that can capture images of the HMD 800. As such, the user 402 is shown turned at about 90 degrees from the camera 912 and a display device 913, as content rendered in the HMD 800 is dependent on the direction that the HMD 800 is positioned, from the perspective of the camera 912. Of course, during HMD use, the user 402 is moving about, turning his head, looking in various directions, as is needed to take advantage of the dynamic interactive scenes rendered by the HMD 800.

Figure 10:
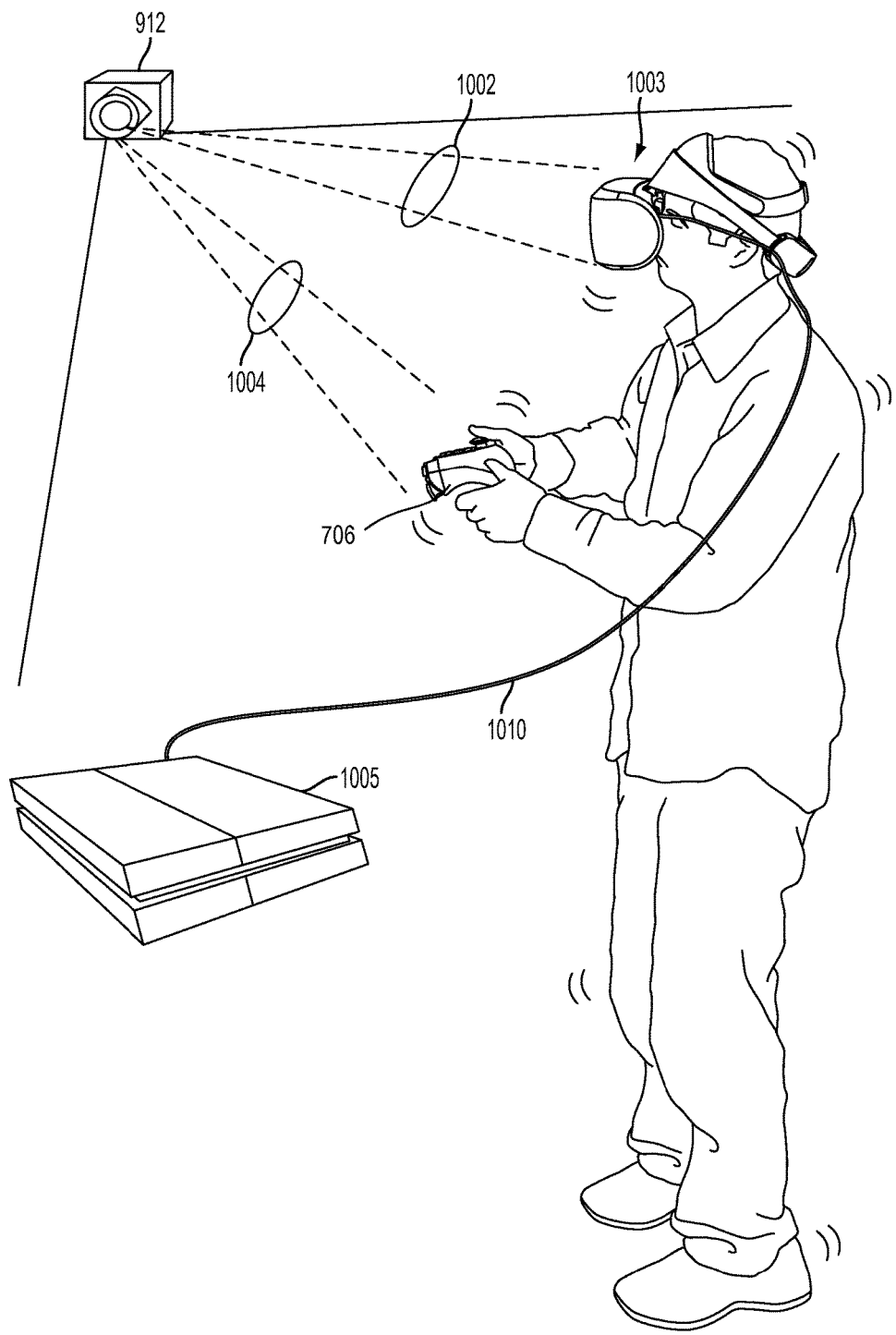
FIG. 10 illustrates a user wearing an HMD, during use, in accordance with one embodiment described in the present disclosure.

FIG. 10 illustrates a user wearing an HMD 1003, during use, in accordance with one embodiment. The HMD 1003 is an example of the HMD 404 (FIG. 4). In this example, it is shown that the HMD 1003 is tracked 1002 using image data obtained from captured video frames by the camera 912. Additionally, it is shown that the hand-held controller 706 is also tracked 1004 using image data obtained from captured video frames by the camera 912. Also shown is the configuration where the HMD 1003 is connected to a game console 1005 via a cable 1010. The game console 1005 is an example of the game console 150 (FIG. 2A) or the game console that is operated by the user 306 (FIG. 3A). In one embodiment, the HMD 800 obtains power from the same cable or can connect to another cable. In still another embodiment, the HMD 800 has a battery that is rechargeable, so as to avoid extra power cords.

Figure 11:
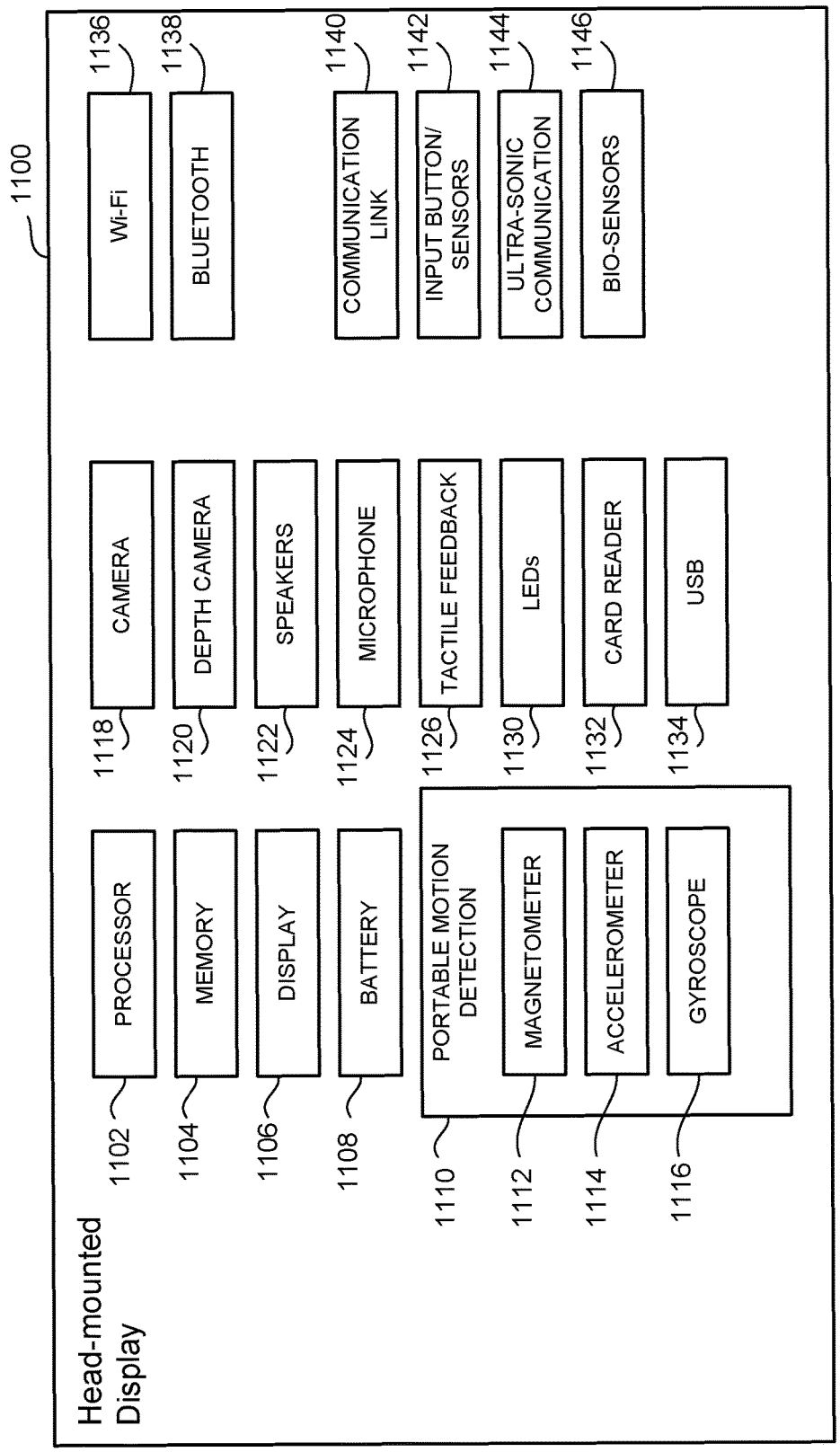
FIG. 11 is a diagram illustrating example components of an HMD, in accordance with one embodiment described in the present disclosure.

With reference to FIG. 11, a diagram is shown illustrating example components of an HMD 1100, in accordance with an embodiment described in the present disclosure. The HMD 1100 is an example of the HMD 404 (FIG. 4). It should be understood that more or less components can be included or excluded from the HMD 1100, depending on the configuration and functions enabled. The HMD 1100 includes a processor 1102 for executing program instructions. A memory 1104 is provided for storage purposes, and in one embodiment, includes both volatile and non-volatile memory. A display 1106 is included which provides a visual interface that the user 402 views.

The display 1106 is defined by one single display, or in the form of a separate display screen for each eye. When two display screens are provided, it is possible to provide left-eye and right-eye video content separately. Separate presentation of video content to each eye, for example, can provide for better immersive control of 3D content. As described herein, in one embodiment, the second screen is provided with second screen content of the HMD 1100 by using the output for one eye, and then formatting the content for display in a 2D format. The one eye, in one embodiment, can be the left-eye video feed, but in other embodiments it can be the right-eye video feed.

A battery 1108 is provided as a power source for the HMD 1100. In other embodiments, the power source includes an outlet connection to power. In other embodiments, an outlet connection to power and the battery 1108 are provided. A motion detection module 1110 includes any of various kinds of motion sensitive hardware, such as a magnetometer 1112, an accelerometer 1114, and a gyroscope 1116.

An accelerometer is a device for measuring acceleration and gravity induced reaction forces. Single and multiple axis (e.g., six-axis) models are able to detect magnitude and direction of the acceleration in different directions. The accelerometer is used to sense inclination, vibration, and shock. In one embodiment, three accelerometers are used to provide the direction of gravity, which gives an absolute reference for two angles (world-space pitch and world-space roll).

A magnetometer measures the strength and direction of the magnetic field in the vicinity of an HMD. In one embodiment, three magnetometers are used within an HMD, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field is warped due to metal in the environment, which causes a warp in the yaw measurement. If necessary, this warp is calibrated using information from other sensors such as the gyroscope or the camera. In one embodiment, accelerometer 1114 is used together with magnetometer 1112 to obtain the inclination and azimuth of the HMD 1100.

A gyroscope is a device for measuring or maintaining orientation, based on the principles of angular momentum. In one embodiment, three gyroscopes provide information about movement across the respective axis (x, y and z) based on inertial sensing. The gyroscopes help in detecting fast rotations. However, the gyroscopes drift overtime without the existence of an absolute reference. To reduce the drift, the gyroscopes are reset periodically, which can be done using other available information, such as positional/orientation determination based on visual tracking of an object, accelerometer, magnetometer, etc.

A camera 1118 is provided for capturing images and image streams of the real-world environment. In one embodiment, more than one camera (optionally) is included in the HMD 1100, including a camera that is rear-facing (directed away from the user 402 when the user 402 is viewing the display of the HMD 1100), and a camera that is front-facing (directed towards the user 402 when the user is viewing the display of the HMD 1100). Additionally, in an embodiment, a depth camera 1120 is included in the HMD 1100 for sensing depth information of objects in the real-world environment.

The HMD 1100 includes speakers 1122 for providing audio output. Also, in one embodiment, a microphone 1124 is included for capturing audio from the real-world environment, including sounds from the ambient environment, speech made by the user 402, etc. In an embodiment, the HMD 1100 includes tactile feedback module 1126 for providing tactile feedback to the user 402. In one embodiment, the tactile feedback module 1126 is capable of causing movement and/or vibration of the HMD 1100 so as to provide tactile feedback to the user 402.

LEDs 1130 are provided as visual indicators of status of the HMD 1100. For example, an LED indicates battery level, power on, etc. A card reader 1132 is provided to enable the HMD 1100 to read and write information to and from a memory card. A USB interface 1134 is included as one example of an interface for enabling connection of peripheral devices, or connection to other devices, such as other portable devices, computers, etc. In various embodiments of the HMD 1100, any of various kinds of interfaces may be included to enable greater connectivity of the HMD 1100.

In an embodiment, a Wi-Fi module 1136 is included for enabling connection to the computer network or to a game console via wireless networking technologies. Also, in one embodiment, the HMD 1100 includes a Bluetooth module 1138 for enabling wireless connection to other devices, e.g., a game console, etc. A communications link 1140 is included for connection to other devices. In one embodiment, the communications link 1140 utilizes infrared transmission for wireless communication. In other embodiments, the communications link 1140 utilizes any of various wireless or wired transmission protocols for communication with other devices.

Input buttons/sensors 1142 are included to provide an input interface for the user 402. Any of various kinds of input interfaces may be included, such as buttons, gestures, touchpad, joystick, trackball, etc. In one embodiment, an ultra-sonic communication module 1144 is included in HMD 1100 for facilitating communication with other devices via ultra-sonic technologies.

In an embodiment, bio-sensors 1146 are included to enable detection of physiological data, e.g., the biometric information, etc., from the user 402. In one embodiment, the bio-sensors 1146 include one or more dry electrodes for detecting bio-electric signals of the user 402 through the user's skin, voice detection, eye retina detection to identify users/profiles, etc.

The foregoing components of HMD 1100 have been described as merely exemplary components that may be included in HMD 1100. In various embodiments described in the present disclosure, the HMD 1100 may or may not include some of the various aforementioned components. Embodiments of the HMD 1100 may additionally include other components not presently described, but known in the art, for purposes of facilitating aspects of the present invention as herein described.

It will be appreciated by those skilled in the art that in various embodiments described in the present disclosure, the aforementioned handheld device is utilized in conjunction with an interactive application displayed on a display to provide various interactive functions. The exemplary embodiments described herein are provided by way of example only, and not by way of limitation.

In one embodiment, the computer 702, as referred to herein, includes a personal computer, or a game console, or a tablet computer, or a smart phone, or a set-top box, or a kiosk, or a wireless device, or a digital pad, or a stand-alone device, or a handheld game playing device, etc. In an embodiment, the computer 702 receives encoded video streams, decodes the video streams, and presents the resulting video to the user 402, e.g., a player of a game. The processes of receiving encoded video streams and/or decoding the video streams typically includes storing individual video frames in a receive buffer of the computer 702. The video streams are presented to the user 402 on a display integral to the computer 702 or on a separate device such as a monitor or television or an HMD.

The computer 702, in one embodiment, supports more than one game player. For example, a game console supports two, three, four or more simultaneous players (e.g., P1, P2, . . . Pn). Each of these players receives or shares a video stream, or a single video stream includes regions of a frame generated specifically for each player, e.g., generated based on each player's point of view. Any number of computers are local (e.g., co-located) or are geographically dispersed. The number of computers included in a game system vary widely from one or two to thousands, tens of thousands, or more. As used herein, the term "game player" is used to refer to a person that plays a game and the term "game playing device" is used to refer to a device used to play a game.

In some embodiments, the game playing device refers to a plurality of computing devices that cooperate to deliver a game experience to a user. For example, a game console and an HMD cooperate with a video server system to deliver a game viewed through the HMD. As another example, the game console receives a video stream from the video server system and the game console forwards the video stream, or updates to the video stream, to an HMD and/or television for rendering.

Still further, an HMD is used for viewing and/or interacting with any type of content produced or used, such as, for example, video game content, movie content, video clip content, web content, advertisement content, contest content, gambling game content, conference call/meeting content, social media content (e.g., posting, messages, media streams, friend events and/or game play), video portions and/or audio content, and content made for consumption from sources over the internet via browsers and applications and any type of streaming content. Of course, the foregoing listing of content is not limiting, as any type of content can be rendered so long as it can be viewed in the HMD or rendered to a screen or screen of the HMD.

In an embodiment, computers further include systems that modify received video. For example, a computer performs further rendering, to overlay one video image on another video image, to crop a video image, and/or the like. As another example, computers receive various types of video frames, such as I-frames, P-frames and B-frames, and to process these frames into images for display to a user. In some embodiments, a part of a computer performs further rendering, shading, conversion to 3-D, conversion to two-dimensional (2D) image, distortion removal, sizing, or like operations on a video stream. In an embodiment, a part of a computer is receives more than one audio or video stream.

Input devices of computers includes, for example, a one-hand game controller, or a two-hand game controller, or a gesture recognition system, or a gaze recognition system, or a voice recognition system, or a keyboard, or a joystick, or a pointing device, or a force feedback device, or a motion and/or location sensing device, or a mouse, or a touch screen, or a neural interface, or a camera, or a combination of two or more thereof, etc.

A video source includes rendering logic, e.g., hardware, firmware, and/or software stored on a computer-readable medium such as storage. This rendering logic creates video frames of the video stream based on the game state. All or part of the rendering logic is optionally disposed within one or more graphics processing unit (GPU). Rendering logic includes processing stages for determining three-dimensional spatial relationships between objects and/or for applying appropriate textures, etc., based on the game state and viewpoint. The rendering logic produces raw video that is encoded. For example, the raw video is encoded according to an Adobe Flash® standard, HTML-5, .wav, H.264, H.263, On2, VP6, VC-1, WMA, Huffyuv, Lagarith, MPG-x, Xvid, FFmpeg, x264, VP6-8, realvideo, mp3, or the like. The encoding process produces a video stream that is optionally packaged for delivery to a decoder on a device. The video stream is characterized by a frame size and a frame rate. Typical frame sizes include 800×600 pixels, 1280×720 pixels, 1024×768 pixels, 1080 pixels, although any other frame sizes may be used. The frame rate is the number of video frames per second. In one embodiment, a video stream includes different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In some embodiments, a computer is a general purpose computer, a special purpose computer, a game console, a personal computer, a laptop computer, a tablet computer, a mobile computing device, a portable gaming device, a cellular phone, a set-top box, a streaming media interface/device, a smart television or networked display, or any other computing device capable of being configured to fulfill the functionality of a computer as defined herein. In one embodiment, a cloud gaming server is configured to detect a type of a computer, which is being utilized by the user 402, and provide a cloud-gaming experience appropriate to the user's computer. For example, image settings, audio settings and other types of settings are optimized for the user's computer.

Figure 12:
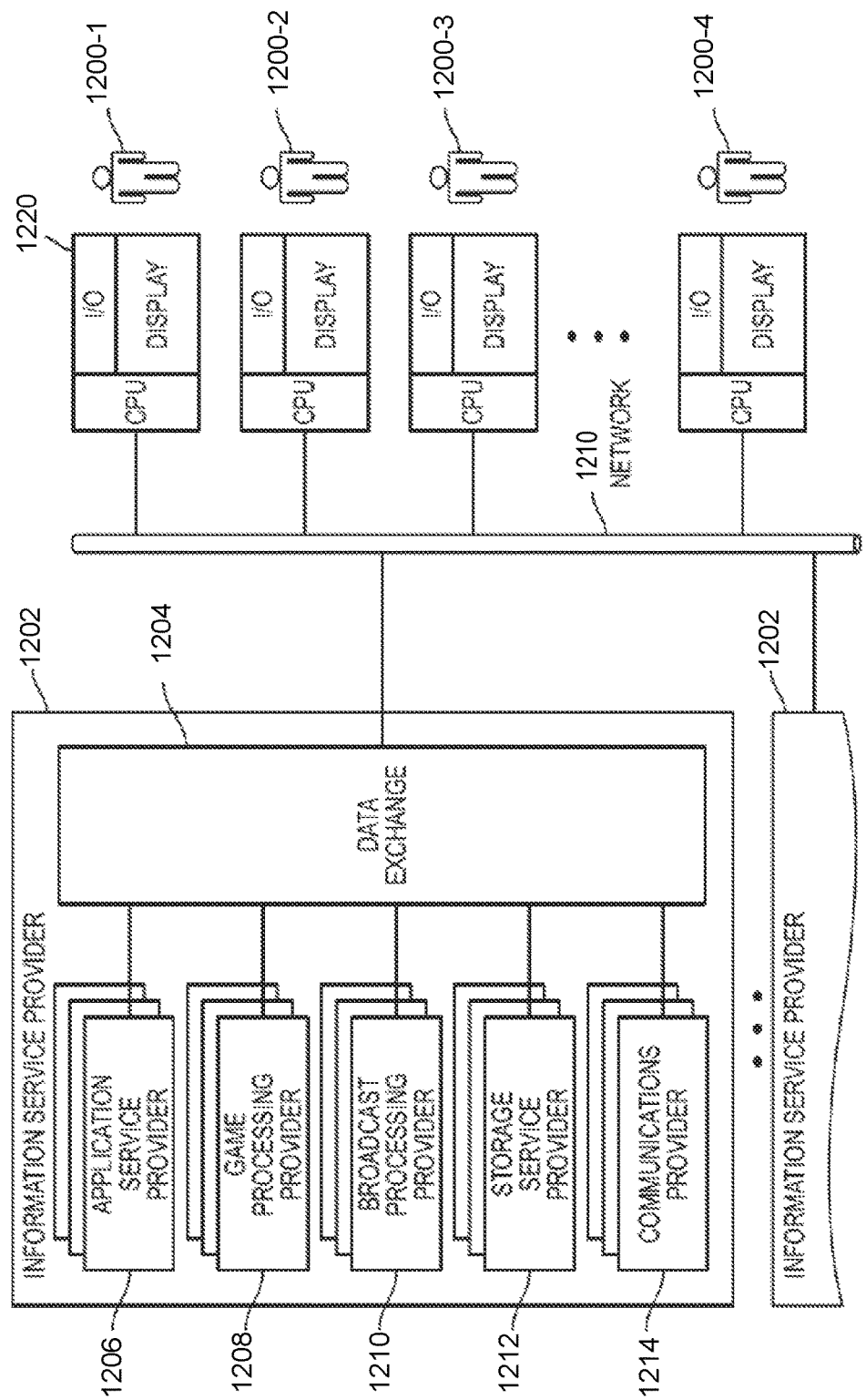
FIG. 12 illustrates an Information Service Provider architecture, in accordance with one embodiment described in the present disclosure.

FIG. 12 illustrates an embodiment of an Information Service Provider architecture. Information Service Providers (ISP) 1202 delivers a multitude of information services to users 1200-1, 1200-2, 1200-3, 1200-4, etc., geographically dispersed and connected via a network 1210, which is an example of the network 204 (FIG. 2A). In one embodiment, an ISP delivers one type of service, such as stock price updates, or a variety of services such as broadcast media, news, sports, gaming, etc. Additionally, the services offered by each ISP are dynamic, that is, services are added or taken away at any point in time. Thus, the ISP providing a particular type of service to a particular individual changes over time. For example, a user is served by an ISP in near proximity to the user while the user is in her home town, and the user is served by a different ISP when the user travels to a different city. The home-town ISP will transfer information and data to the new ISP, such that information regarding the user 402 "follows" the user 402 to the new city making the data closer to the user 402 and easier to access. In another embodiment, a master-server relationship is established between a master ISP, which manages the information for the user 402, and a server ISP that interfaces directly with the user 402 under control from the master ISP. In another embodiment, the data is transferred from one ISP to another ISP as a computer moves around the world to make the ISP in better position to service the user 402 be the one that delivers these services.

ISP 1202 includes an application service provider (ASP) 1206, which provides computer-based services to customers over the network 1210. Software offered using an ASP model is also sometimes called on-demand software or software as a service (SaaS). A simple form of providing access to a particular application program (such as customer relationship management) is by using a standard protocol such as hypertext transfer protocol (HTTP). The application software resides on the vendor's system and is accessed by users through a web browser using hypertext markup language (HTML), by special purpose client software provided by the vendor, or other remote interface such as a thin client.

Services delivered over a wide geographical area often use cloud computing. Cloud computing is a style of computing in which dynamically scalable resources are provided as a service over the network 1210. Users do not need to be an expert in the technology infrastructure in the "cloud" that supports them. In one embodiment, cloud computing are divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1202 includes a game processing server (GPS) 1208, which is used by game computers to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS 1208 establishes communication between the players and their respective game-playing devices exchange information without relying on the centralized GPS 1208.

Dedicated GPSs are servers which run independently of a computer. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

A broadcast processing server (BPS) 2204 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

A storage service provider (SSP) 1212 provides computer storage space and related management services. SSPs also offer periodic backup and archiving. By offering storage as a service, users can order more storage as needed. Another major advantage is that SSPs include backup services and users will not lose all their data if their computers' hard drives fail. Further, in an embodiment, a plurality of SSPs have total or partial copies of the user data, allowing users to access data in an efficient way independently of where the user is located or the device being used to access the data. For example, the user 402 accesses personal files in a home computer, as well as in a mobile phone while the user 402 is on the move.

A communications provider 1214 provides connectivity to users. One kind of communications provider is an Internet Service Provider (ISP) which offers access to the Internet. The ISP connects its customers using a data transmission technology appropriate for delivering Internet Protocol datagrams, such as dial-up, digital subscriber line (DSL), cable modem, fiber, wireless or dedicated high-speed interconnects. The Communications Provider can also provide messaging services, such as e-mail, instant messaging, and short message service (SMS) texting. Another type of communications provider is a Network Service provider (NSP), which sells bandwidth or network access by providing direct backbone access to the Internet. Network service providers, in one embodiment, include telecommunications companies, data carriers, wireless communications providers, Internet service providers, cable television operators offering high-speed Internet access, etc.

A data exchange 1204 interconnects the several modules inside ISP 1202 and connects these modules to users 1200 via the network 1210. The data exchange 1204 covers a small area where all the modules of ISP 1202 are in close proximity, or covers a large geographic area when the different modules are geographically dispersed. For example, the data exchange 1288 includes a fast Gigabit Ethernet (or faster) within a cabinet of a data center, or an intercontinental interactive area network (VLAN).

Each user 1200-1, 1200-2, 1200-3, and 1200-4 accesses the remote services with a client device 1220, which includes at least a CPU, a display and input/output interface (I/O). In one embodiment, a client device is a personal computer (PC), a mobile phone, a netbook, tablet, gaming system, a personal digital assistant (PDA), etc. In one embodiment, the ISP 1202 recognizes a type of client device and adjusts the communication method employed. In other cases, client devices use a standard communications method, such as HTML, to access the ISP 1202.

In one embodiment, instead of a game console, a computing device, e.g., a tablet, a computer, a smart television, etc., is used to perform the operations described herein as being performed by the game console.

Embodiments described in the present disclosure may be practiced with various computer system configurations including hand-held devices, microprocessor systems, microprocessor-based or programmable consumer electronics, minicomputers, mainframe computers and the like. The embodiments described in the present disclosure can also be practiced in distributed computing environments where tasks are performed by remote processing devices that are linked through a wire-based or wireless network.

With the above embodiments in mind, it should be understood that the embodiments described in the present disclosure can employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Some embodiments described in the present disclosure can also be embodied as computer-readable code on a computer-readable medium. The computer-readable medium is any data storage device that can store data, which can be thereafter be read by a computer system. Examples of the computer-readable medium include a hard drive, a NAS, a ROM, a RAM, a compact disc ROM (CD-ROM), a CD-recordable (CD-R), a CD-rewritable (CD-RW), a magnetic tape, an optical data storage device, a non-optical data storage device, etc. As an example, a computer-readable medium includes computer-readable tangible medium distributed over a network-coupled computer system so that the computer-readable code is stored and executed in a distributed fashion.

It should be noted that in some embodiments, any of the embodiments described herein can be combined with any of the remaining embodiments.

Moreover, although some of the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure has been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for executing computer instructions for presenting an interactive environment in a head-mounted display, comprising:

identifying an interactive object in the interactive environment, the interactive environment to be presented on a display device of the head-mounted display worn by a user;

determining whether content of the interactive object satisfies a threshold for presentation on the display device of the head-mounted display for the user;

augmenting the interactive object to cover the interactive object after determining that the content of the interactive object does not satisfy the threshold for presentation to the user;

providing the augmented interactive object to be displayed on the head-mounted display for the user, wherein while the interactive object is being augmented, sending the content of the interactive object via a computer network to an administrator account to determine whether the content is to be approved or disapproved; and continuing to augment the interactive object upon receiving a disapproval of the content of the interactive object from the administrator account.

2. The method of claim 1, further comprising:
receiving biometric information regarding the user;
determining based on the biometric information an age of the user;
determining that the age of the user is less than a pre-determined age,
wherein said augmenting the interactive object is performed upon determining that the age of the user is less than the pre-determined age.

3. The method of claim 1, further comprising:
accessing a user profile of the user;
identifying an age of the user from the user profile;
determining that the age of the user is less than a pre-determined age,
wherein said augmenting the interactive object is performed upon determining that the age of the user is less than the pre-determined age.

4. The method of claim 1, further comprising:
accessing ratings of an additional interactive object that is similar to the interactive object in the interactive environment,
wherein said determining whether the content of the interactive object satisfies the threshold comprises determining based on the ratings that the content of the interactive object in the interactive environment does not satisfy the threshold.

5. The method of claim 4, wherein the ratings are accessed from a social network, or from a game network, or from content producers of the additional interactive object that is similar to the interactive object in the interactive environment.

6. The method of claim 1, further comprising accessing a content control level set via the administrator account that is assigned to an administrator,
wherein said determining whether the content of the interactive object satisfies the threshold is performed based on the content control level.

7. The method of claim 6, further comprising:
accessing a rating assigned to the interactive object;
determining whether the rating exceeds the content control level,
wherein said determining whether the content of the interactive object satisfies the threshold includes determining that the content of the interactive object does not satisfy the threshold, wherein said determining that the content of the interactive object does not satisfy the threshold includes determining that the rating exceeds the content control level.

8. The method of claim 1, wherein the interactive object is an avatar of the user, wherein said augmenting the interactive object includes changing a look and feel of a part of the avatar without changing functionality of the avatar.

9. The method of claim 1, wherein said augmenting the interactive object to cover the interactive object comprises replacing the interactive object with a virtual object.

10. The method of claim 1, wherein said augmenting the interactive object to cover the interactive object comprises replacing the interactive object with a virtual object, wherein the interactive object is associated with additional interactive objects within the interactive environment, the method further comprising replacing the additional interactive objects with a plurality of additional virtual objects when the interactive object is replaced with the virtual object.

11. A system for executing computer instructions for presenting an interactive environment in a head-mounted display, comprising:
the head-mounted display configured to be worn by a user, wherein the head-mounted display has a display device; and
a content processor coupled to the head-mounted display, wherein the content processor is configured to:
identify an interactive object in the interactive environment, the interactive environment to be presented on the display device of the head-mounted display;
determine whether content of the interactive object satisfies a threshold for presentation on the display device of the head-mounted display for the user;
augment the interactive object to cover the interactive object after determining that the content of the interactive object does not satisfy the threshold for presentation to the user;
provide the augmented interactive object to be displayed on the display device of the head-mounted display for the user;
wherein while the interactive object is being augmented, send the content of the interactive object via a computer network to an administrator account to determine whether the content is to be approved or disapproved; and
continue to augment the interactive object upon receiving a disapproval of the content of the interactive object from the administrator account.

12. The system of claim 11, wherein the content processor is further configured to:
receive biometric information regarding the user;
determine based on the biometric information an age of the user;
determine that the age of the user is less than a pre-determined age,
wherein the interactive object is augmented upon determining that the age of the user is less than the pre-determined age.

13. The system of claim 11, wherein the content processor is further configured to:
access a user profile of the user;
identify an age of the user from the user profile; and
determine that the age of the user is less than a pre-determined age,
wherein the interactive object is augmented upon determining that the age of the user is less than the pre-determined age.

14. The system of claim 11, wherein the content processor is further configured to:
access ratings of an additional interactive object that is similar to the interactive object in the interactive environment, wherein the content processor is configured to determine based on the ratings that the content of the interactive object in the interactive environment does not satisfy the threshold.

15. The system of claim 14, wherein the ratings are accessed from a social network, or from a game network, or from content producers of the additional interactive object that is similar to the interactive object in the interactive environment.

16. The system of claim 11, wherein the content processor is further configured to access a content control level set via the administrator account that is assigned to an administrator, wherein the content processor is configured to determine based on the content control level that the content of the interactive object in the interactive environment does not satisfy the threshold.

17. The system of claim 16, wherein the content processor is further configured to:

access a rating assigned to the interactive object;
compare the rating with the content control level; and
determine that the rating exceeds the content control level to determine that the content of the interactive object does not satisfy the threshold.

18. The system of claim 11, wherein the content processor is located within a game console.

19. The system of claim 11, wherein the interactive object is an avatar of the user, wherein the content processor is configured to change a look and feel of a part of the avatar without changing functionality of the avatar to augment the interactive object.

20. A non-transitory computer-readable medium containing program instructions for presenting an interactive environment in a head-mounted display, wherein execution of the program instructions by one or more processors of a computer system causes the one or more processors to carry out a plurality of operations of:

identifying an interactive object in the interactive environment, the interactive environment to be presented on a display device of the head-mounted display worn by a user;
determining whether content of the interactive object satisfies a threshold for presentation on the display device of the head-mounted display for the user;
augmenting the interactive object to cover the interactive object after determining that the content of the interactive object does not satisfy the threshold for presentation to the user;
providing the augmented interactive object to be displayed on the head-mounted display for the user,
wherein while the interactive object is being augmented, sending the content of the interactive object via a computer network to an administrator account to determine whether the content is to be approved or disapproved; and
continuing to augment the interactive object upon receiving a disapproval of the content of the interactive object from the administrator account.

21. The computer-readable medium of claim 20, wherein the operations further comprise:

receiving biometric information regarding the user;
determining based on the biometric information an age of the user;
determining that the age of the user is less than a pre-determined age,
wherein said augmenting the interactive object is performed upon determining that the age of the user is less than the pre-determined age.

* * * * *